US011112529B2

(12) United States Patent
Yen et al.

(10) Patent No.: US 11,112,529 B2
(45) Date of Patent: Sep. 7, 2021

(54) DETECTING SYSTEM AND DETECTING METHOD

(71) Applicant: SYNCMOLD ENTERPRISE CORP., New Taipei (TW)

(72) Inventors: Ching-Hui Yen, New Taipei (TW); Szu-Chia Chao, New Taipei (TW); Yen-Ming Lai, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 102 days.

(21) Appl. No.: 16/550,946

(22) Filed: Aug. 26, 2019

(65) Prior Publication Data

US 2020/0064511 A1     Feb. 27, 2020

Related U.S. Application Data

(60) Provisional application No. 62/723,115, filed on Aug. 27, 2018.

(30) Foreign Application Priority Data

Jul. 25, 2019    (TW) ................................. 108209709

(51) Int. Cl.
    *G01V 8/20*      (2006.01)
    *B25J 9/16*      (2006.01)

(52) U.S. Cl.
    CPC .............. *G01V 8/20* (2013.01); *B25J 9/1664* (2013.01)

(58) Field of Classification Search
    CPC ....................................................... F16P 3/144
    See application file for complete search history.

(56) References Cited

U.S. PATENT DOCUMENTS

| | | | | |
|---|---|---|---|---|
| 3,120,654 A | * | 2/1964 | Gwyn | ................ G08B 13/187 340/556 |
| 4,107,522 A | | 8/1978 | Walter | |
| 2005/0207619 A1 | | 9/2005 | Lohmann | |

(Continued)

FOREIGN PATENT DOCUMENTS

| | | |
|---|---|---|
| DE | 10026710 A1 | 11/1993 |
| DE | 202014104531 U | 10/2014 |
| EP | 0569990 A1 | 11/1993 |

*Primary Examiner* — Thanh Luu

(74) *Attorney, Agent, or Firm* — Muncy, Geissler, Olds & Lowe, P.C.

(57) ABSTRACT

A detecting system for protection of equipment is provided. The equipment is disposed on a working surface, which is defined with a working space. The detecting system comprises a first diverting element, a detecting apparatus, and a three-dimensional first safety wave curtain. The diverting element approximately surrounds the equipment and is disposed away from the working surface with respect to the equipment. The detecting apparatus includes an electronic control device and a first detector, and the first detector has a transmitter, a receiver, and a controller. The controller controls the transmitter and the receiver to synchronously rotate about an axis, N detection waves are sequentially transmitted with N times of time detections correspondingly during every rotation. The detection waves cooperate with the diverting surface of the first diverting element and the working surface to form the first safety wave curtain.

17 Claims, 20 Drawing Sheets

(56) References Cited

U.S. PATENT DOCUMENTS

| | | | |
|---|---|---|---|
| 2015/0212209 A1* | 7/2015 | Iwasawa | G01S 17/04 356/5.01 |
| 2016/0086469 A1 | 3/2016 | Balbach | |
| 2017/0219706 A1* | 8/2017 | Baldischweiler | G01S 7/4972 |

* cited by examiner

DETECTING SYSTEM AND DETECTING METHOD

CROSS REFERENCE TO RELATED APPLICATION

This application claims the benefit of U.S. Provisional Application Ser. No. 62/723,115 filed on Aug. 27, 2018, and the benefit of Taiwan Patent Application Serial No. 108209709 filed on Jul. 25, 2019. The entirety of each application is incorporated herein by reference.

BACKGROUND OF THE INVENTION

1. Field of the Invention

The present invention relates to a detecting system and a detecting method. More particularly, the present invention relates to a detecting system and a detecting method for detecting if any object approaches mechanical equipment in operation.

2. Description of Related Art

Most of the mechanical equipment is dangerous in operation in the industrial environment, and serious consequences may be caused if the mechanical equipment in operation is accidentally approached. Take a robotic arm as an example, if an object or a person gets into the operating area of the robotic arm, injury or damage may be caused to the object, the person, or the robotic arm.

The present robotic arm is configured with safety light curtains. However, the present safety light curtain has the following disadvantages: (1) each set of the safety light curtains is planar (i.e. a plane shape), and at least four sets of the safety light curtains are required to form an enclosing cover. For example, four safety light curtains should be respectively configured to front, back, left, and right to form a rectangular enclosing cover; (2) each set of the safety light curtains has a plurality of optical axes, and each of the optical axes is defined by a transmitter and a receiver (the detection accuracy may be increased by increasing the density of the optical axes, however, the more optical axes are needed, the higher cost is required); and (3) the overall expense of the construction of the present safety light curtain is still too expensive as recited above.

SUMMARY OF THE INVENTION

To solve the abovementioned problems, the present invention provides a detecting system to detect if there is any object approaching into a predetermined area around the mechanical equipment. The detecting system of the present invention can immediately sense once there is an object intrudes into the predetermined area. The equipment in operation is then controlled to reduce the operating speed or to stop operating to avoid the damage to the equipment or people. The detecting system of the present invention is relatively simple. Only one set of transmitter and receiver is required to provide a multifaceted safety light curtain.

The main object of the present invention is to provide a detecting system for the protection of an equipment. The equipment is disposed on a working surface, and defines a working space corresponding to the working surface. The detecting system comprises a first diverting element, a detecting apparatus, and a three-dimensional first safety wave curtain. The diverting element approximately surrounds the equipment and is disposed away from the working surface with respect to the equipment. The first diverting element includes at least one diverting surface, and the diverting surface is not parallel to the working surface. The detecting apparatus includes an electronic control device and a first detector. The first detector has a transmitter, a receiver, and a controller. The first safety wave curtain surrounds the working space. The controller controls the transmitter and the receiver to synchronously rotate about an axis, and N detection waves are sequentially transmitted along with N times of time detections correspondingly during every rotation. The detection waves cooperate with the diverting surface of the first diverting element and the working surface to form the first safety wave curtain.

A first category of time interval $T1i$ is defined as a time interval between an i-th detection wave transmitted by the transmitter and received by the receiver when there is no object intruding into the first safety wave curtain. The time interval between the i-th detection wave transmitted by the transmitter and received by the receiver is not equal to the first category of time interval $T1i$ when there is an object intruding into the first safety wave curtain.

The first safety wave curtain comprises a cover area approximately vertical to the axis and a surrounding area corresponding to the axis.

The cover area is formed between the transmitter and the first diverting element, and the surrounding area is formed between the first diverting element and the working surface.

In one embodiment, the detecting system further comprises a first supporting frame. The first supporting frame includes at least one vertical pole, a platform, and at least one extension pole. The at least one vertical pole is disposed on the working surface. The platform is disposed on the at least one vertical pole. The at least one extension pole is disposed on the platform and extend outwards to connect the first diverting element. The transmitter and the receiver of the first detector are disposed on the platform.

In one embodiment, there are four extension poles. The first diverting element includes four bodies and four diverting surfaces. Each of the diverting surfaces is correspondingly formed on each of the bodies, and each of the bodies is correspondingly disposed on each of the extension poles. The bodies surround to form a rectangle.

In one embodiment, the diverting element includes a body and a diverting surface, the diverting surface is formed on the body, and the body is circular.

A first path $PA1i$ includes an $A1i$ section, a $B1i$ section, a $C1i$ section, and a $D1i$ section. The i-th detection wave travels from the transmitter to the first diverting element along the $A1i$ section, travels from the first diverting element to the working surface along the $B1i$ section, travels from the working surface to the first diverting element along the $C1i$ section, and then travels from the first diverting element to the receiver along the $D1i$ section.

The time interval between the i-th detection wave transmitted by the transmitter and received by the receiver is a second category of time interval, a third category of time interval, or a fourth category of time interval when there is an object intruding into the first safety wave curtain. The second category of time interval is shorter than the first category of time interval, the third category of time interval is longer than the first category of time interval, and the fourth category of time interval is defined as that the i-th detection wave is received or not received by the receiver after a predetermined time.

In one embodiment, the detecting system further comprises a second diverting element, which approximately surrounds the equipment and is disposed away from the working surface with respect to the equipment. The second diverting element includes at least one diverting surface, and the diverting surface is not parallel to the working surface. The detecting system further comprises a three-dimensional second safety wave curtain, which is formed between the working space and the first safety wave curtain. The detecting apparatus further comprises a second detector. The second detector has a transmitter, a receiver, and a controller. The controller of the second detector controls the transmitter and the receiver of the second detector to synchronously rotate about the axis. N detection waves are sequentially transmitted along with N times of time detections correspondingly during every rotation. The detection waves cooperate with the diverting surface of the second diverting element and the working surface to form the second safety wave curtain.

A first category of time interval T1i is defined as a time interval between an i-th detection wave transmitted by the transmitter of the second detector and received by the receiver of the second detector when there is no object intruding into the second safety wave curtain. The time interval between the i-th detection wave transmitted by the transmitter of the second detector and received by the receiver of the second detector is not equal to the first category of time interval T1i when there is an object intruding into the second safety wave curtain.

A first path PA1i includes an A1i section, a B1i section, a C1i section, and a D1i section. The i-th detection wave travels from the transmitter of the second detector to the second diverting element along the A1i section, travels from the second diverting element to the working surface along the B1i section, travels from the working surface to the second diverting element along the C1i section, and then travels from the second diverting element to the receiver of the second detector along the D1i section.

The time interval between the i-th detection wave transmitted by the transmitter of the second detector and received by the receiver of the second detector is a second category of time interval, a third category of time interval, or a fourth category of time interval when there is an object intruding into the first safety wave curtain. The second category of time interval is shorter than the first category of time interval, the third category of time interval is longer than the first category of time interval. The fourth category of time interval is defined as that the i-th detection wave is received or not received by the receiver of the second detector after a predetermined time.

The detecting system of the present invention is further adapted for a safety protection detection method, which comprises the following steps of:

S1: defining a working space of an equipment disposed on a working surface;

S2: disposing a detecting system outside of the working space, the detecting system comprising a detecting apparatus, a first diverting element, and a first supporting frame;

S3: forming a three-dimensional first safety wave curtain to surround the working space;

S4: defining a basic time interval of the i-th detection wave;

S5: executing detection and determination; and

S6: transmitting signals when it is necessary.

The step S4 comprises a step of: transmitting N detection waves during every rotation and determining the basic time interval of each of the N detection waves in a safety status.

The step S5 comprises steps of: transmitting N detection waves sequentially and processing N time detections correspondingly during every rotation; comparing a time interval detected for the i-th detection wave with the basic time interval of the i-th detection wave; and determining whether a threshold value is reached The step S6 comprises a step of: informing an alarm to alert when the threshold value is reached.

DETAILED DESCRIPTION OF THE PREFERRED EMBODIMENT

Figure 1:
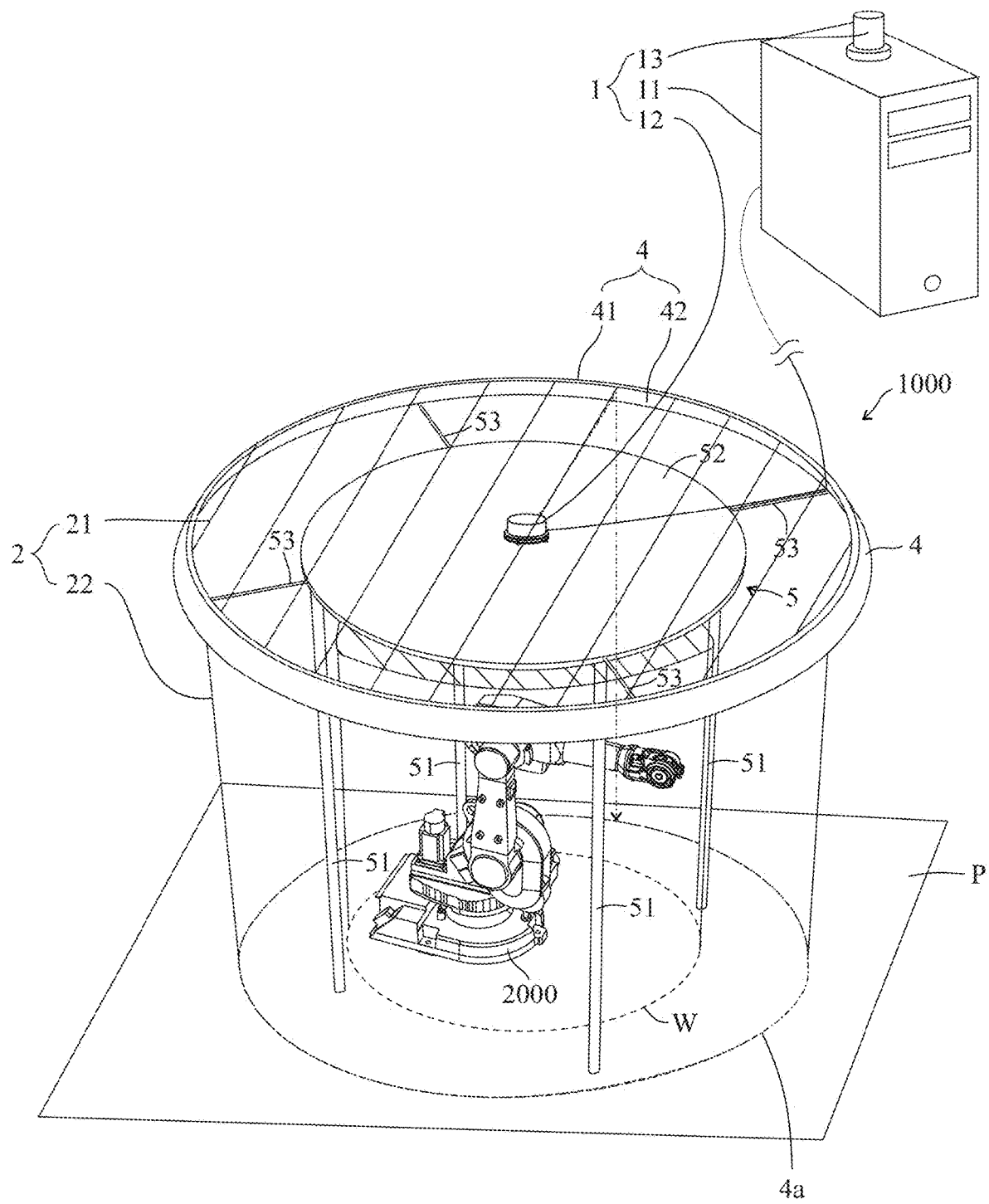
FIG. 1 is a perspective view showing the detecting system of the first embodiment of the present invention.
Figure 2:
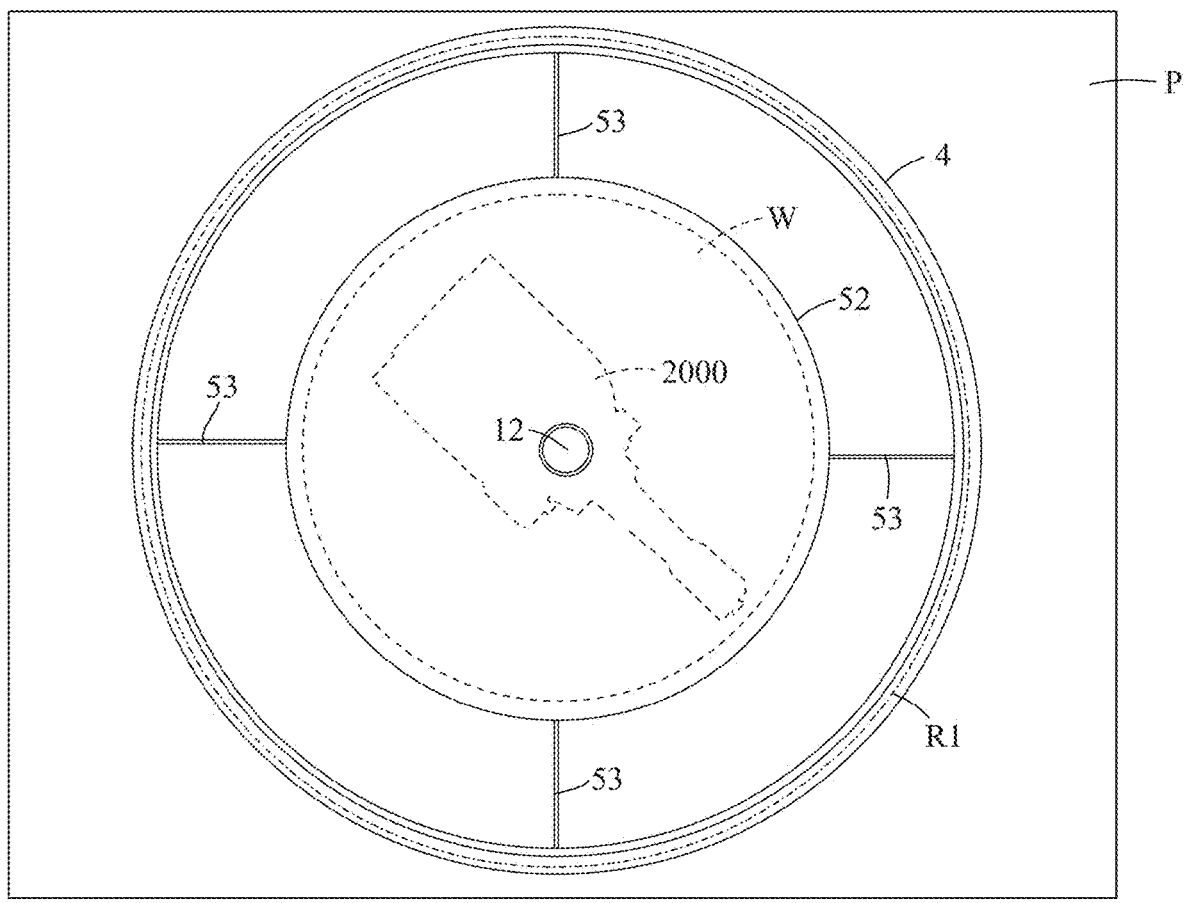
FIG. 2 is a top view showing the detecting system of the first embodiment of the present invention.
Figure 3:
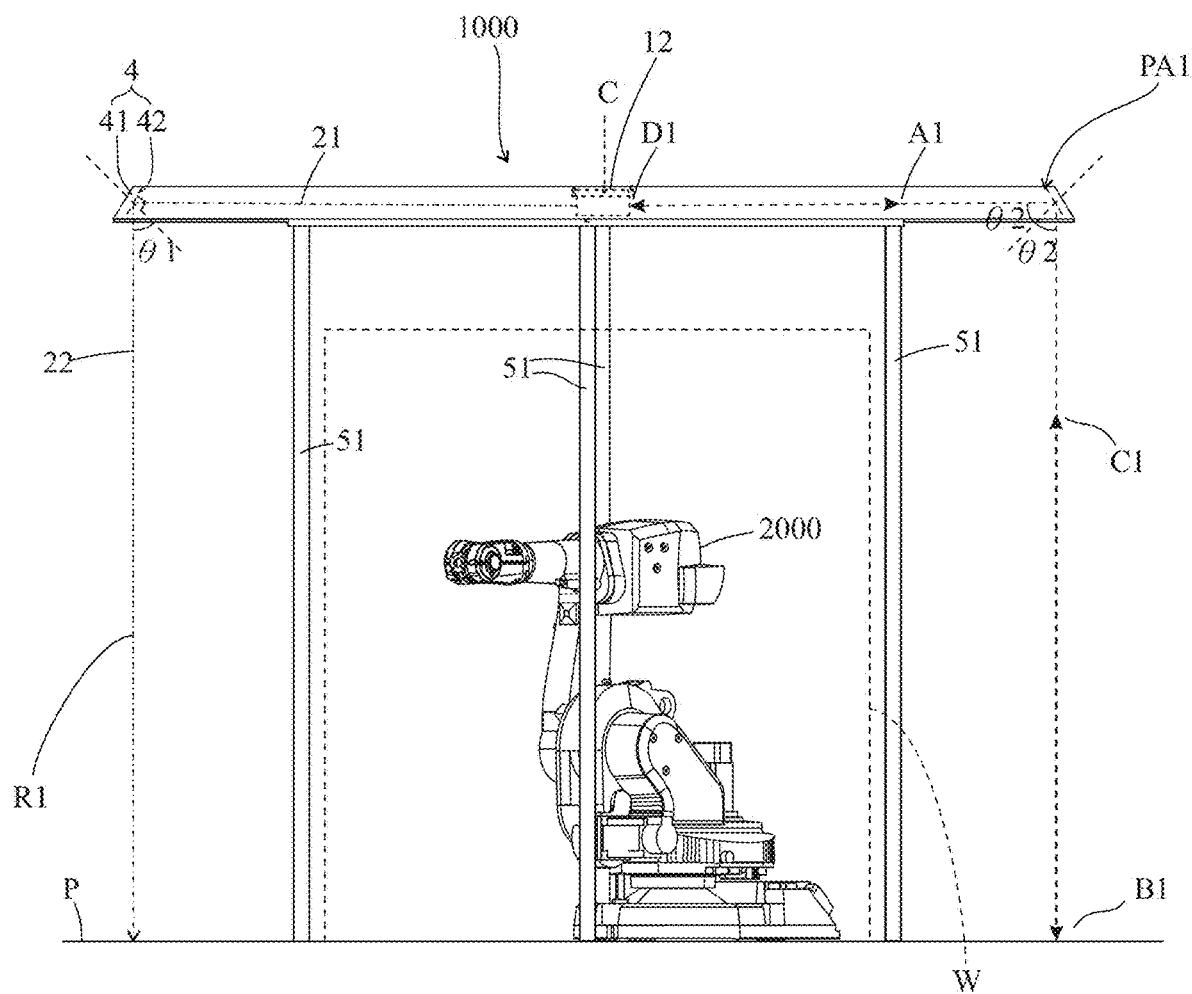
FIG. 3 is a side view showing the detecting system of the first embodiment of the present invention.

Please refer to FIG. 1, FIG. 2, and FIG. 3, which illustrate a detecting system 1000 adapted to robotic arm equipment 2000. However, the application of the present invention is not limited thereto and may be adapted to any equipment with safety protection needs. The robotic arm equipment 2000 is disposed on a working surface P. In the present embodiment, the working surface P is the ground. A three-dimensional working space W as shown in the dashed area of FIG. 1, FIG. 2, and FIG. 3 may be defined above the working surface P according to the area that an object held by the robotic arm may reach when the robotic arm equipment 2000 is in operation. In other words, the working space W of the robotic arm equipment 2000 would be confirmed before the detecting system 1000 is set up. The detecting system 1000 of the present embodiment comprises a detecting apparatus 1, and a three-dimensional first safety wave curtain 2, a first diverting element 4, and a first supporting frame 5.

The first supporting frame 5 surrounds the working space W at a distance to avoid collision between the first supporting frame 5 and the robotic arm equipment 2000 during operation. The first supporting frame 5 includes four vertical poles 51, a platform 52, and four extension poles 53. The vertical poles 51 are spaced from one another on the working surface P. The platform 52 is disposed on the vertical poles 51. The extension poles 53 are spaced from one another on the edge of the platform 52 and extend outwards away from the platform 52. The detecting apparatus 1 has a first detector 12 disposed on the center of the platform 52. In other embodiments, the first detector 12 may be disposed on the place other than the center of the platform 52.

The first diverting element 4 includes a body 41 and a diverting surface 42. The body 41 surrounds to form an enclosed shape (including, but not limited to a circular shape). The body 41 is disposed on the four extension poles and spaced from the platform 52. In other words, the body 41 surrounds the first detector 12. The diverting surface 42 is formed on one side of the body 41 that is adjacent to the first detector 12. In the present embodiment, the normal line to the diverting surface 42 and the normal line to the working surface P are not parallel and a first angle θ1 is formed therebetween. The diverting surface 42 may be made of optically reflective material or may be a plastic piece coated with an optically reflective material layer. The optically reflective material includes, but not limited to, aluminum alloys and silver alloys.

Please refer to FIG. 1, the detecting apparatus 1 includes an electronic control device 11, the first detector 12, and an alarm 13, which are communicatively connected to each other.

The electronic control device 11 is provided for a user to give an instruction to operate the first detector 12, and the electronic control device converts the data transmitted from the first detector 12 for determination. The electronic control device 11 transmits an alarm signal to the alarm 13 to alert when it is necessary. Furthermore, the electronic control device 11 may be communicatively connected to the robotic arm equipment 2000, and the alarm signal is transmitted to the robotic arm equipment 2000 to make it correspondingly react, for example, stop operating. The electronic control device 11 may be a computer, or a Programmable Logic Controller (PLC), or an Embedded System in practice.

Please refer to FIG. 1, FIG. 5, FIG. 6, and FIG. 7, the first detector 12 is configured on the platform 52 of the first supporting frame 5 and has a base 121, a rotation module 122, a transmitter 123, a receiver 124, and a controller 125. The controller 125, taking a Micro Control Unit (MCU) as an example, is communicatively connected to the electronic control device 11. The controller 125 controls the rotation and the rotation speed of the rotation module 122, controls the switching status and the transmission frequency of the transmitter 123, controls the receiving frequency of the receiver 124, and transmits the results received by the receiver 124 to the electronic control device 11. The transmitter 123 and the receiver 124 synchronously rotate about an axis C. When the transmitter 123 is turned on, the transmitter 123 transmits a plurality of detection waves, which are directional waves, approximately along the radial direction of the axis C and approximately parallel to the working surface P. The receiver 124 receives detection waves correspondingly to the number of switching times of the transmitter 123. The receiver 124 has a lens 1241 and a sensor (not shown). The lens 1241 may be a wide-angle lens to widen the receiving angle or a filtering lens to filer part of the interference waves. The sensor is adapted for sensing the returned detection waves.

In the present embodiment, the first detector 12 is a lidar, which is generally installed on a robotic vacuum cleaner to scan positions and distances of obstacles in a horizontal environment close to the ground. Therefore, the robotic vacuum cleaner can dodge the obstacles. Basically, the lidar scans parallel to the ground. The rotation speed of the rotation module 122 may be chosen in the range of 85-428 RPM. The transmitter 123 transmits laser light with the wavelength in the range of 775-795 nm and with the power in the range of 2-5 mW. The number of the switching times of the transmitter 123 during every rotation may be chosen in the range of 300-1300 times. In other words, 300-1300 detection waves are transmitted during every rotation. The maximum effective detection distance is 6 meters, and a round-trip distance is 12 meters. It should be noted that the time of every rotation and the number of the detection waves transmitted by the transmitter 123 of every rotation may be adjusted based on the needs of the user. For example, the rotation module takes 1 second for every rotation, and the transmitter transmits 50 detection waves during every rotation. Moreover, the laser light may be replaced with directional infrared rays or sound waves.

Figure 4:
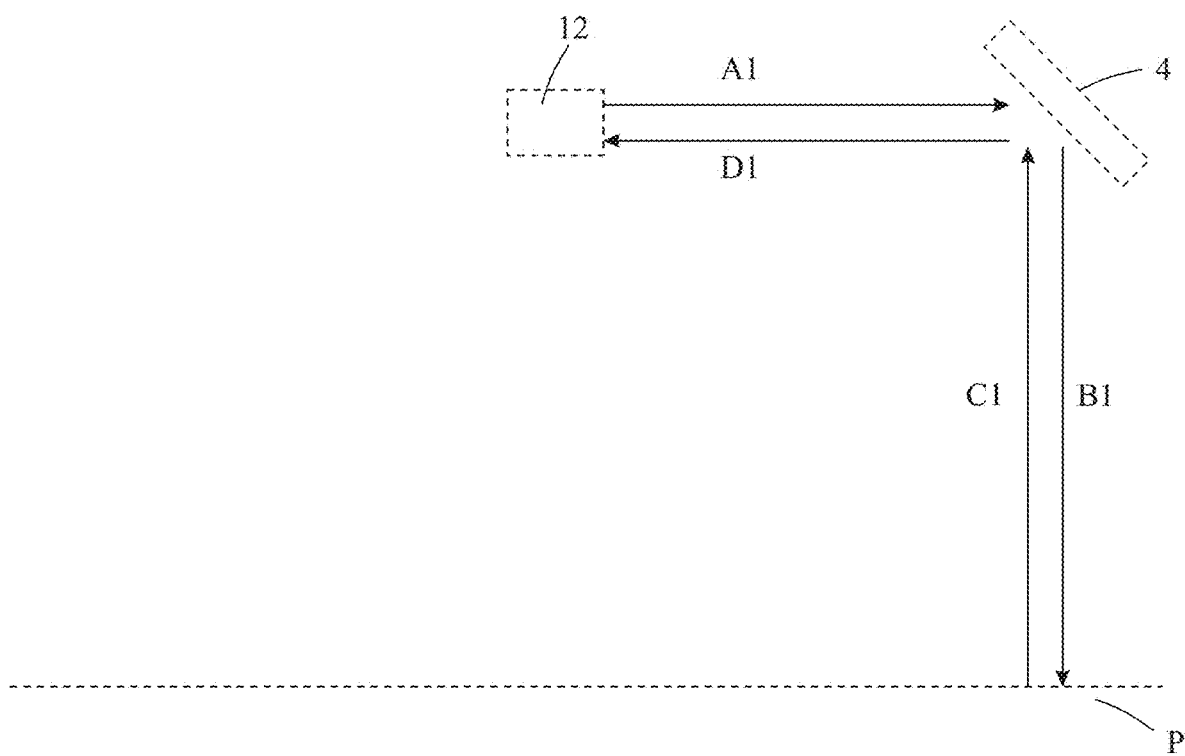
FIG. 4 is a schematic view showing the path of the detection waves when there is no object intruding into the detecting system of the first embodiment of the present invention.
Figure 5:
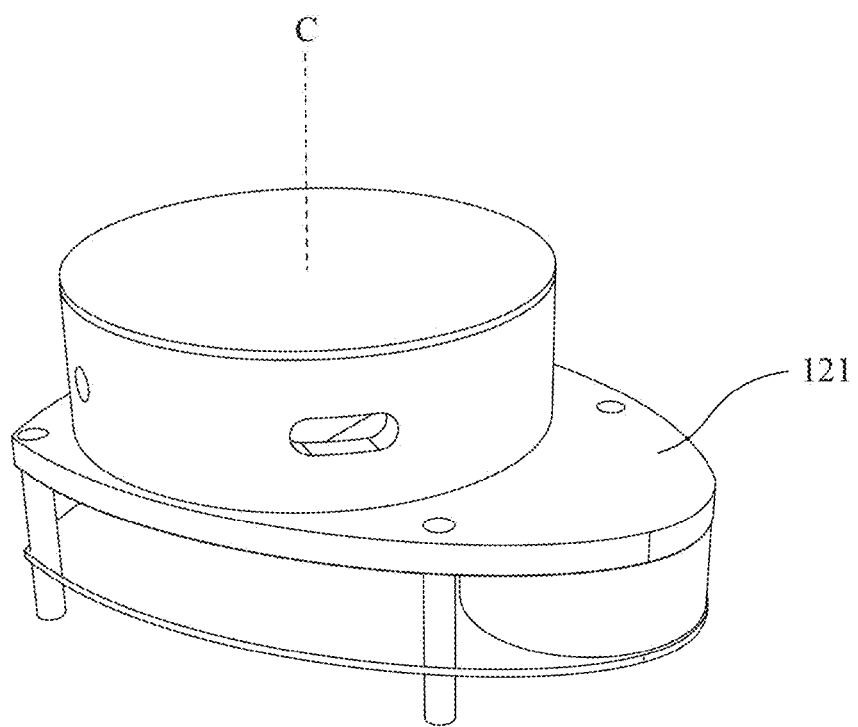
FIG. 5 is a perspective view of the first detector of the detecting system of the first embodiment of the present invention.
Figure 6:
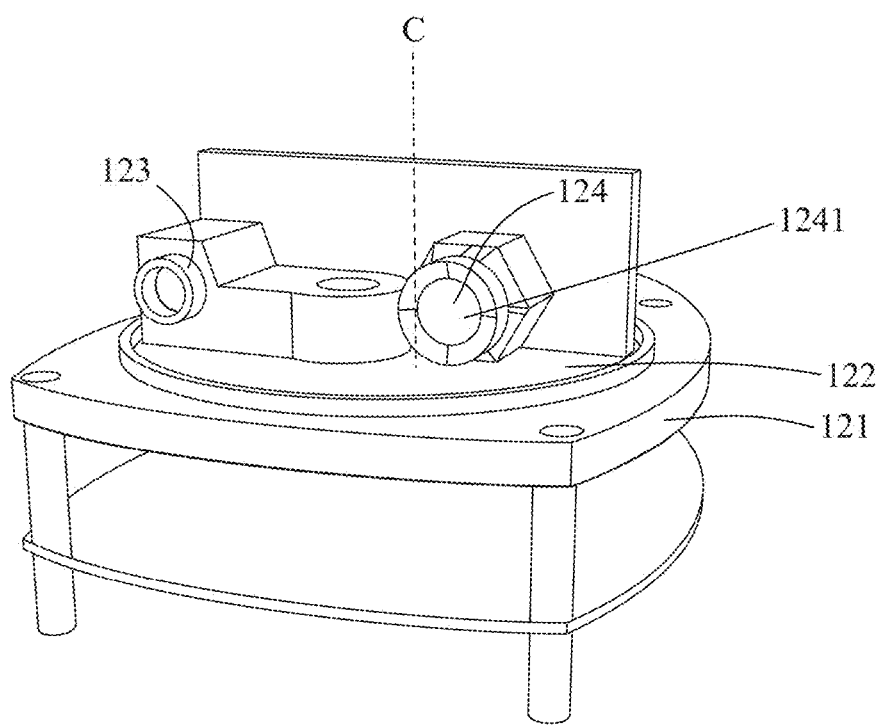
FIG. 6 and FIG. 7 are partial perspective views of the first detector of the detecting system of the first embodiment of the present invention.
Figure 7:
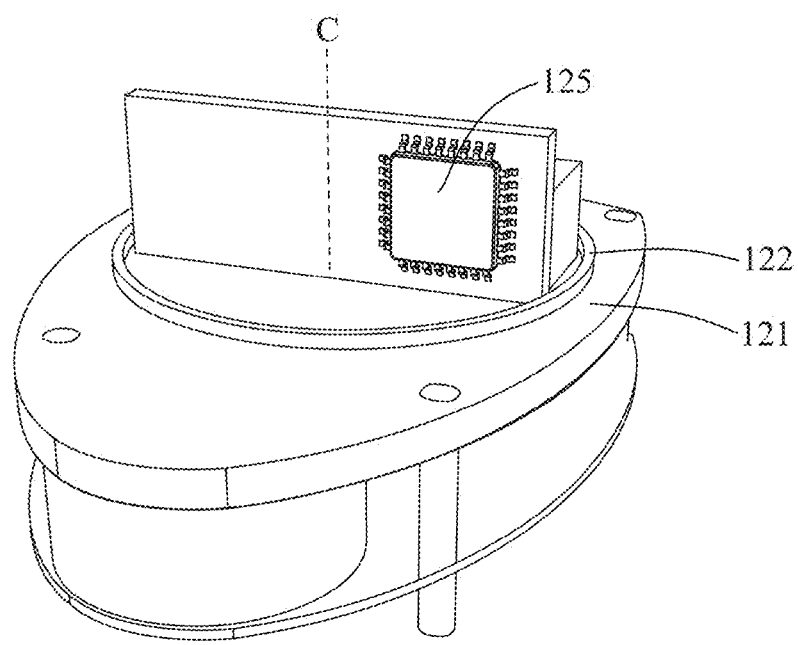

As illustrated in FIG. 3 and FIG. 4, when there is no object (for example, a person) intruding, the detection waves transmitted from the transmitter 123 approximately travel along the radial direction of the axis C from the axis C and approximately parallel to the working surface P. The directions of the detection waves are changed after reaching the diverting surface 42 of the first diverting element 4. For instance, the detection waves are reflected by the diverting surface 42. Then, the detection waves travel approximately parallel to the axis C and approximately vertical to the working surface P, and then the detection waves arrive the working surface P. There are only one transmitter 123 and one receiver 124, and one detection wave is transmitted at a time instead of multiple detection waves being transmitted at the same time. However, the rotation speed of the rotation module 122 is high, and the time for switching the transmitter 123 is short. The result is similar to configuring a plurality of light beams, which are around the robotic arm equipment 2000. Therefore, the detecting system 1000 of the present embodiment has a similar effect to that of the conventional safety light curtains which have a plurality of light beams (or optical axes), and builds the three-dimensional first safety wave curtain 2. When there is an object intruding into the first safety wave curtain 2, the object, which has a relatively low speed, can be detected. In more detail, the first safety wave curtain 2 surrounds the working space W and is configured radially from the transmitter 123, which is located on the axis C. The first safety wave curtain 2 includes a cover area 21 and a surrounding area 22. When there is no object intruding, the detection waves in the cover area 21 travels along radial directions of the axis C and approximately parallel to the working surface P, and the detection waves in the surrounding area 22 travels parallel to the axis C and approximately vertical to the working surface P. In more detail, the cover area 21 of the present embodiment is a round plane which is formed between the transmitter 123 and the first diverting element 4 and is parallel to the working surface P. The first diverting element 4 has an orthographic projection image 4a onto the working surface P as shown in FIG. 1. The surrounding area 22 is a surrounding surface that connects the first diverting element 4 and the orthographic projection image 4a. Therefore, the surrounding surface which has, but not limited to, a cylindrical shape, and surrounds the working space W, is defined in the present embodiment. In other words, the first safety wave curtain 2 is set with the above configuration, and the first detector 12 proceed the protection detection (or protection scan) in the range of the first safety wave curtain 2 continuously.

The transmitter 123 and the receiver 124 are described in detail to explain the way that the conventional safety light curtains which have the plurality of light beams (or optical axes), is similarly provided by the present embodiment. When the rotation module 122 drives the transmitter 123 and the receiver 124 to complete a rotation (360 degrees), the controller 125 controls the transmitter 123 to be switched on and off for N cycles. (One cycle comprises switching the transmitter 123 on once and switching the transmitter 123 off once.) The same process is repeated in every rotation. If it takes S seconds to complete a rotation, each of the cycles spends S/N seconds. The transmitter 123 is alternately and repeatedly switched on for S/2N seconds and switched off for S/2N seconds. For example, it takes 0.2 seconds to complete a rotation, and the transmitter 123 is repeatedly switched on and off for 360 times during one rotation. Then the transmitter 123 repeats 360 times to be switched on for $1/3600$ seconds and then switched off for $1/3600$ seconds, and each cycle is $1/1800$ seconds. 360 detection waves comprising a first detection wave, a second detection wave, a third detection wave, . . . , an i-th detection wave, . . . , and an N-th detection wave are thereby provided. The N detection waves are radially transmitted from the transmitter 123, which is located on the axis C.

In addition to providing N detection waves with the abovementioned method, a coding wave that changes every $1/3600$ seconds can be used to provide the similar result.

The receiver 124 rotates along with the transmitter 123 and detects 360 times during every rotation. Each of the detection waves is detected with a time interval. In other words, the first detection wave is detected with a first time interval, the second detection wave is detected with a second time interval, . . . , the i-th detection wave is detected with an i-th time interval, . . . , the N detection wave is detected with an N-th time interval. Basically, the i-th time interval means a round-trip time that the i-th detection wave is transmitted by the transmitter 123 and received by the receiver 124. However, there are exceptions that are described below.

Figure 8:
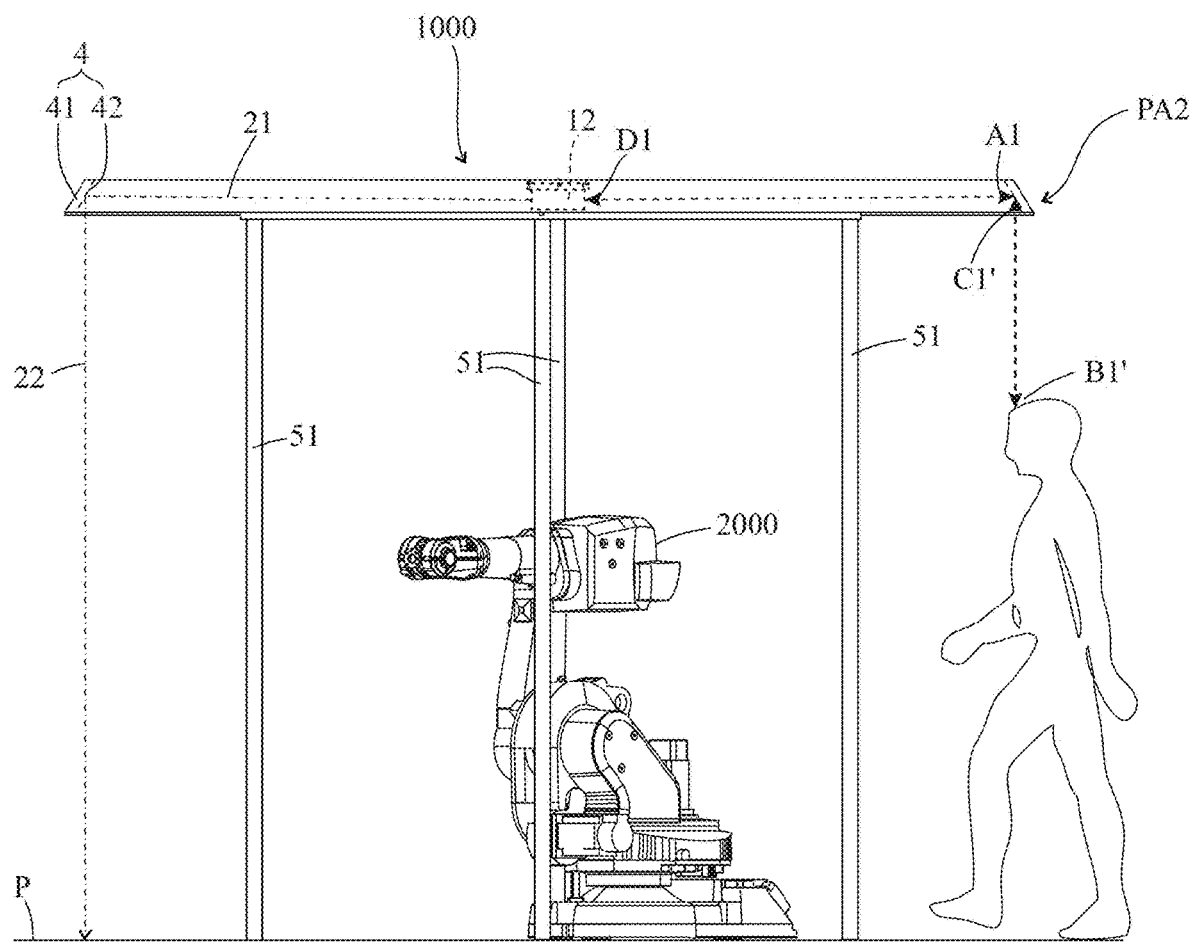
FIG. 8 is another side view showing the detecting system of the first embodiment of the present invention.
Figure 9:
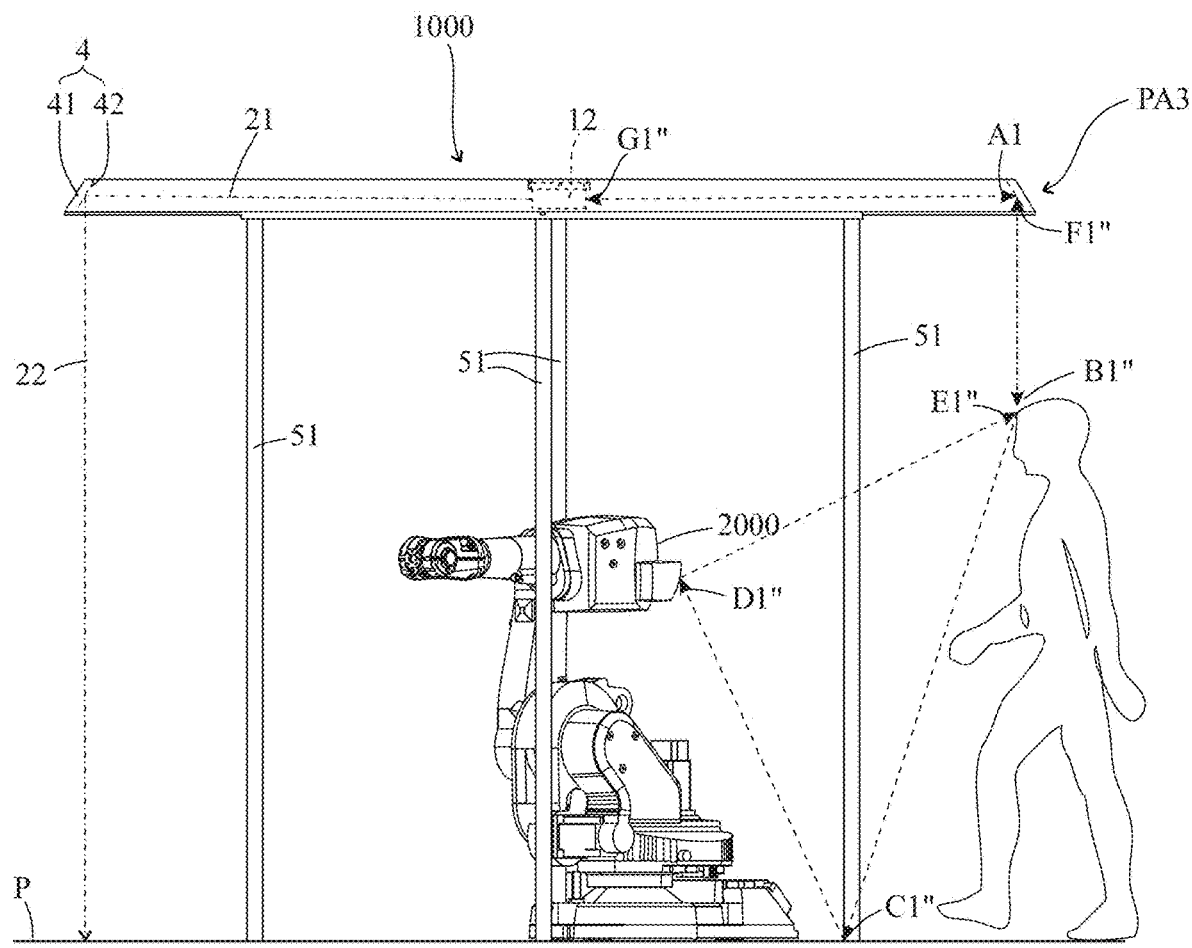
FIG. 9 is another side view showing the detecting system of the first embodiment of the present invention.
Figure 10:
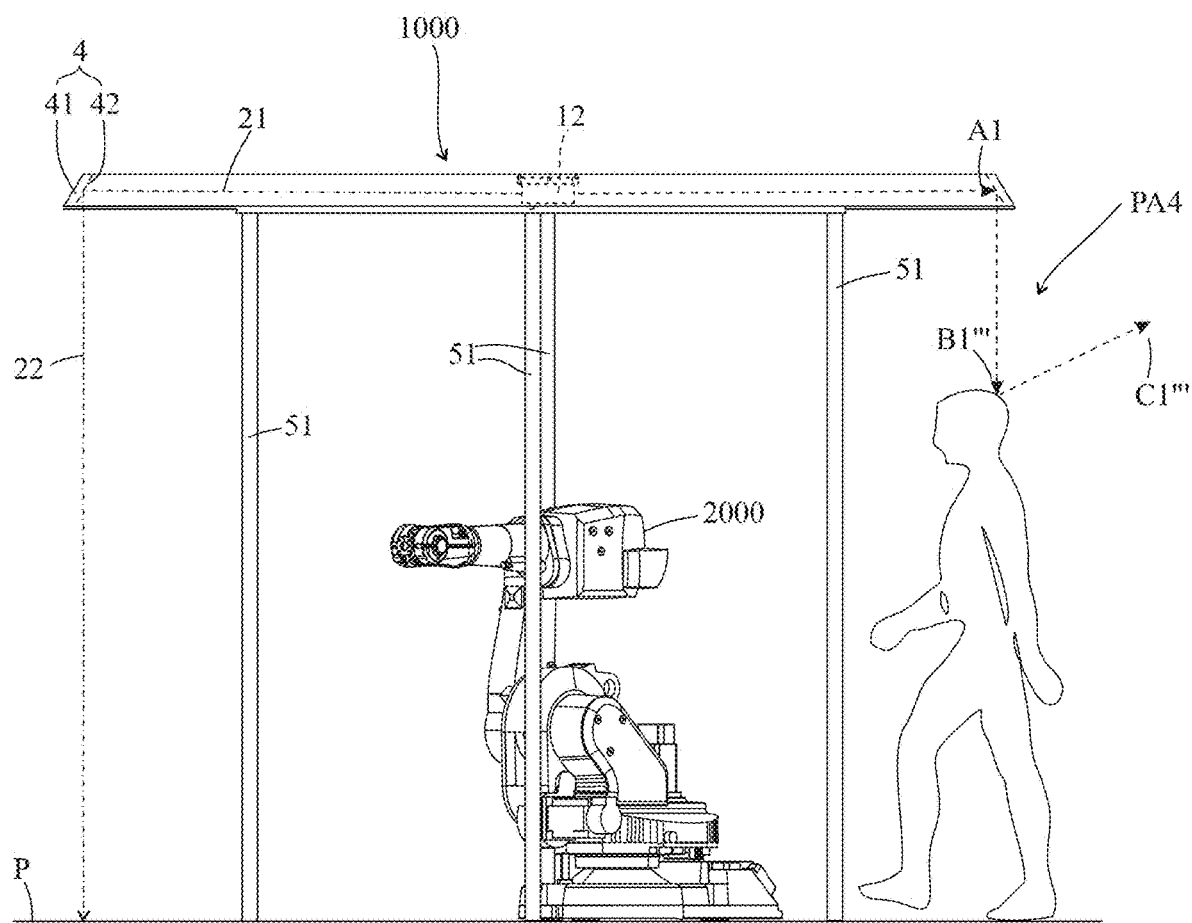
FIG. 10 is another side view showing the detecting system of the first embodiment of the present invention.

The first safety wave curtain 2 has N detection waves repeated in every rotation. The travel paths of part of the detection waves may change when there is an object intruding, and the round-trip time of the detection waves correspondingly change, which can be the basis to determine if there is any object. Please refer to FIG. 3, FIG. 8, FIG. 9, and FIG. 10, in which the possible travel paths of the detection waves transmitted by the transmitter 123 are illustrated. The possible travel paths may result in different round-trip time. Basically, the different round-trip time can be categorized into four types, including a first category of time interval, a second category of time interval, a third category of time interval, and a fourth category of time interval. The first category of time interval is the result of a safety status as shown in FIG. 3. It is also named as a basic status when there is no object intruding into a first alarm range R1. The second category of time interval as shown in FIG. 8, the third category of time interval as shown in FIG. 9, and the fourth category of time interval as shown in FIG. 10 are the results of an intrusion status when there is an object intruding into the first alarm range R1. The details will be described below.

Please refer to FIG. 3 and FIG. 4 again. The detection waves with the first category of time interval travel back and forth along a first path PA1, which includes an A1 section (outbound horizontal section), a B1 section (outbound vertical section), a C1 section (return vertical section), and a D1 section (return horizontal section) in the present embodiment. Each of the detection wave travels from the transmitter 123 to the diverting surface 42 of the first diverting element 4 along the A1 section with an incident angle θ2, is reflected to divert to travel to the working surface P along the B1 section with a reflection angle θ2, is reflected to travel to the diverting surface 42 of the first diverting element 4 along the C1 section, and then is reflected to divert to travel to the receiver 124 along the D1 section. In the safety status, the detection waves travel back and forth with the first category of time interval T1i and an overall length of the first path L1i.

It should be noted that the first detector 12 may not be located in the center of the platform 52, and the first diverting element 4 may not be the circular shape in other embodiments. Therefore, the detection waves with different angles (or directions) travel back and forth along different paths. When there is no object intruding, the A1 section, the B1 section, the C1 section, and the D1 section may be neither the same as the A2 section, the B2 section, the C2 section, and the D2 section, nor the same as the A3 section, the B3 section, the C3 section, and the D3 section in other embodiments. Since the round-trip time of the detection waves of the same round of the rotation may vary, the comparison should be made by, for example, comparing the $8^{th}$ detection wave of the first round of the rotation with the $8^{th}$ detection wave of the second round of the rotation. It means that the i-th detection waves of different rounds of rotations should be compared instead of comparing the i-th detection wave with the i+l-th detection wave.

The i-th detection wave traveling back and forth along the first path PA1i, which includes the A1i section, the B1i section, the C1i section, and the D1i section, is defined with the first category of time interval T1i and the overall length of the first path L1i. The abovementioned details are results of the safety status where there is no object intruding into the first alarm range R1 in this status. In order to facilitate the comparison, the first category of time interval T1i is also named as a basic time interval TOi and the overall length of the first path L1i is also named as an overall length of a basic path LOi.

Each of the detection waves transmitted from the transmitter 123 is a light beam, which includes a plurality of particles, in the view of Corpuscular Theory. The light beam slightly scatters during the travel and after being reflected and diverted. The category of the time interval is determined once the receiver 124 receives the particle of the detection wave that returns first. To establish the basic information and to avoid the error, the basic time interval TOi (the first category of time interval T1i) of the i-th detection wave is, but not limited to, the average of the time intervals of several rounds (3-5 rounds, for example) and is used as a basic standard value.

The second category of time interval is then specified. The second category of time interval is shorter than the first category of time interval. The detection wave travels along a second path PA2, which is shorter than the first path PA1, and spends a shorter round-trip time when there is an object intruding into the first alarm range R1. As shown in FIG. 8, after the detection wave finishes the A1 section of the first path PA1, the detection wave meets the object in a B1' section instead of finishing the whole B1 section. The detection wave is reflected to travel to the diverting surface 42 of the first diverting element 4 along a C1' section, and then travels to the receiver 124 along the D1 section. Obviously, the detection wave travels along a shorter path and spends a shorter round-trip time in the above status. In other circumstances, the object may intrude into the A1 section, and the detection wave is directly reflected to the receiver 124. As long as the round-trip time that the detection wave spends is shorter than the first category of time interval, it is defined as the second category of time interval. The i-th detection wave traveling back and forth along the second path PA2i is defined with a second category of time interval T2i and an overall length of the second path L2i. The following formulas are thereby concluded. $T2i<T1i$ (TOi); $L2i<L1i$(LOi).

The third category of time interval is longer than the first category of time interval. The detection wave changes to travel along a third path PA3, which is longer than the first path PA1, and spends a longer round-trip time when there is the object intruding into the first alarm range R1. As shown in FIG. 9, after the detection wave finishes the A1 section of the first path PA1, the detection wave meets the object in a B1" section. The detection wave travels along a C1" section, a D1" section, an E1" section, an F1" section, and a G1" section before traveling to the receiver 124. Obviously, the detection wave travels along a longer path and spends a longer round-trip time in the above status. As long as the round-trip time that the detection wave spends is longer than the first category of time interval, no matter how many sections the detection wave travels, it is defined as the third category of time interval. The i-th detection wave traveling back and forth along the third path PA3i is defined with a third category of time interval T3i and an overall length of the third path L3i. The following formulas are thereby concluded. $T3i>T1i$(TOi); $L3i>L1i$(LOi).

The fourth category of time interval is defined in a special situation. A fourth path PA4 that the detection wave travels is way too long or the detection wave can't even travel to the receiver when there is the object intruding into the first alarm range R1. The fourth category of time interval is then defined when the receiver 124 receives the detection wave after a predetermined time or does not receive the detection wave at all. The predetermined time is the time interval between each of the detection waves is transmitted. For example, the predetermined time is the time interval between the first detection wave is transmitted and the second detection wave is transmitted. The predetermined time may be set with a value, for example, 0.5 ins. As shown in FIG. 10, after the detection wave finishes the A1 section of the first path PA1, the detection wave meets the object in a B1''' section and then is gone along a C1''' section. The receiver 124 could not receive the returned detection wave before the next detection wave is transmitted, and the controller 125 would determine the category of the time interval of this situation as the fourth category of time interval. In other words, the i-th detection wave traveling along the fourth path PA4i is defined with a fourth category of time interval T4i. The following formulas are thereby concluded. $T4i>T1i$(TOi)

In summary, the safety status (or the basic status) with no object intruding into a first alarm range R1 is determined when the time interval that any of the detection waves spends is the first category of time interval. The intrusion is determined when the time interval that any of the detection waves spends (could be the second category of time interval, the third category of time interval, or the fourth category of time interval) is not equal to the first category of time interval. No matter the time interval is shorter or longer than the first category of time interval.

There could be a minor error during every detection. Therefore, the comparison mentioned above accepts, but not limited to, 20% differences, and it is determined that there is an object intrudes if the time interval measured for the i-th detection wave is larger than 1.2 T1i or shorter than 0.8 T1i. Other percentage differences, such as a value between 2%-50%, are also acceptable according to the detection needs.

The following description specifies the way to determine an intruding direction of the object. There are 360 detection waves in each rotation. If each rotation starts from direct upside in FIG. 2 (i.e. from the twelve o'clock position), the $1^{st}$ to the $90^{th}$ detection waves of every rotation stand for the first quadrant, the $91^{st}$ to the $180^{th}$ detection waves of every rotation stand for the second quadrant, the $181^{st}$ to the $270^{th}$ detection waves of every rotation stand for the third quadrant, and the $271^{st}$ to the $360^{th}$ detection waves of every rotation stand for the fourth quadrant. If the time intervals detected for the $96^{th}$ to $131^{st}$ detection waves are not equal to the first category of time interval T1i, i.e. the basic time interval TOi, the object intrudes from the second quadrant.

More specifically, it is determined that there is an object intruding when the time interval detected for the i-th detection wave is not equal to the first category of time interval T1i. However, to avoid misjudgment, the controller 125 would not inform the alarm 13 to alert until a threshold value is reached. In the present embodiment, the threshold value is defined as that the time intervals detected for 5 consecutive detection waves, for example, from the $18^{th}$ to the $22^{nd}$ detection waves (i.e. the i-th to the i+4-th), are not equal to the first category of time interval T1i. Similarly, the threshold value may be set to detect 3 to 50 consecutive detection waves according to the detection needs. In order to avoid any exceptions, the threshold value may be defined from detecting non-consecutive detection waves. For example, the alarm 13 alerts when the time intervals detected for 20% of N detection waves are not equal to the first category of time interval T1i. In addition to alert, the electronic control device 11 may transmit a signal to the robotic arm equipment 2000 at the same time to stop operating or to operate with a safety relay.

The vertical poles 51 and the extension poles 53 of the first supporting frame 5 may be designed to be adjustable, and the height, the length, and the width of the first supporting frame 5 may be correspondingly adjusted according to the robotic arm equipment 2000 (having different working spaces W) of different dimensions. The extension poles 53 may further have a pillar and an adjustable fixing plate (not shown). The body 41 is disposed on the adjustable fixing plate, and an angle between the body 41 and the pillar can be adjusted.

Although the three-dimensional first safety wave curtain 2 does not have the real light beam (optical axis) intervals like the conventional safety light curtains, it still has equivalent beam intervals for transmitting N detection waves during one rotation in a short time. The equivalent beam intervals radially expand outwards from the transmitter 123 and have a positive correlation with the distance between the transmitter 123 and the first diverting element 4.

Figure 11:
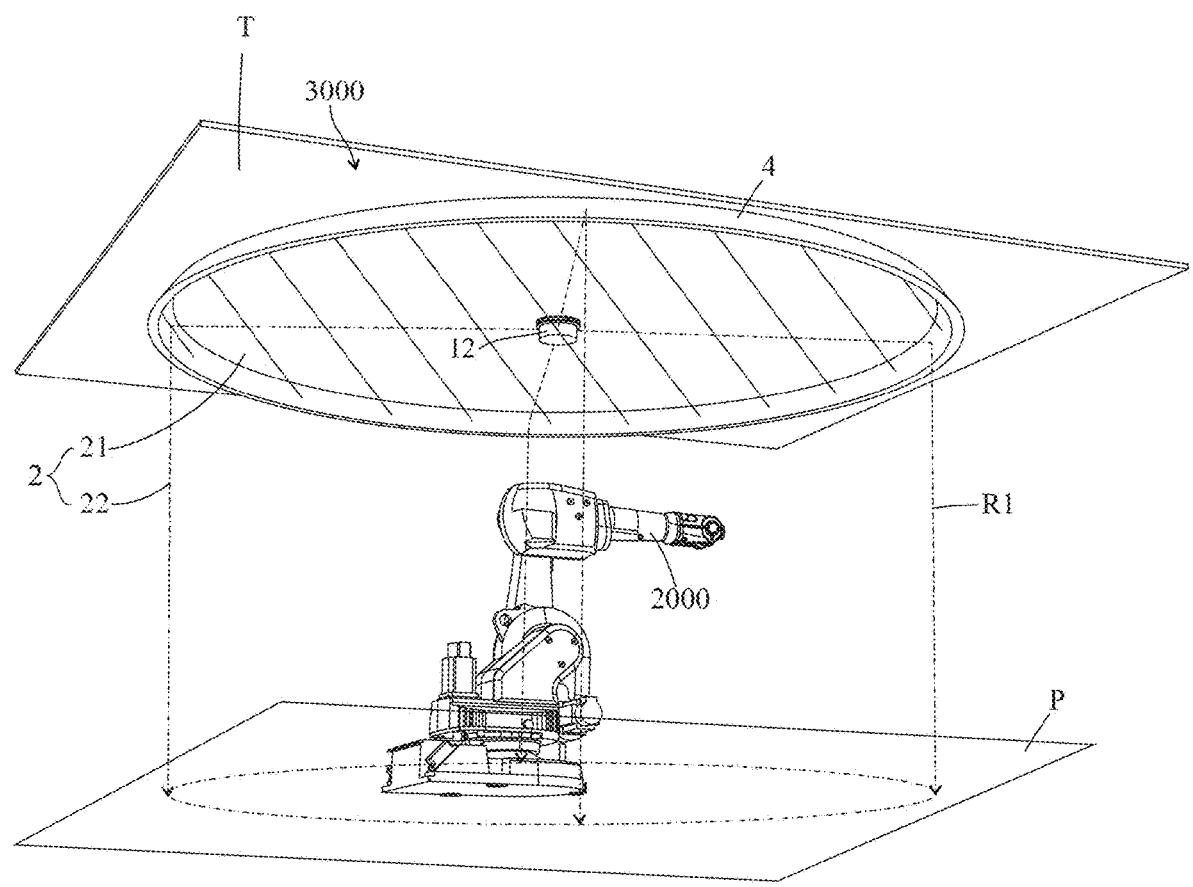
FIG. 11 is a perspective view showing the detecting system of the second embodiment of the present invention.
Figure 12:
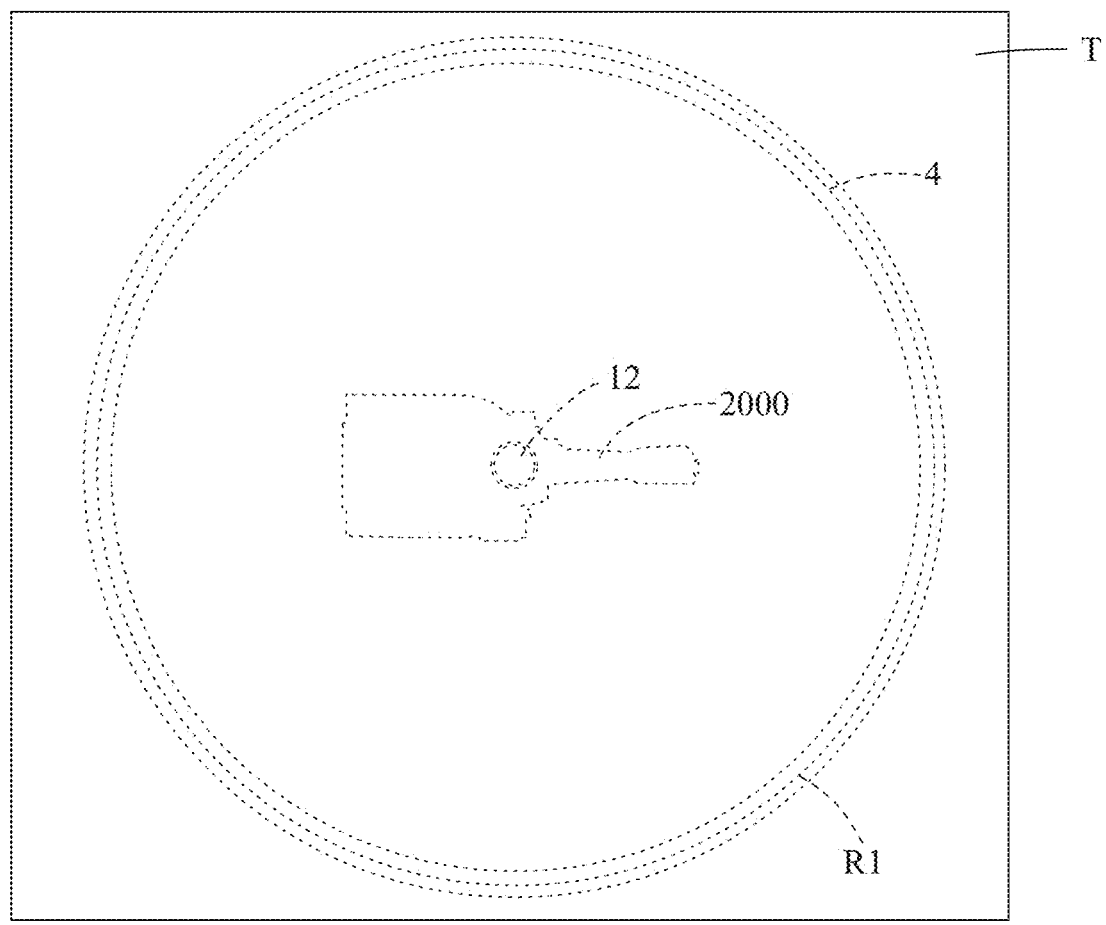
FIG. 12 is a top view showing the detecting system of the second embodiment of the present invention.
Figure 13:
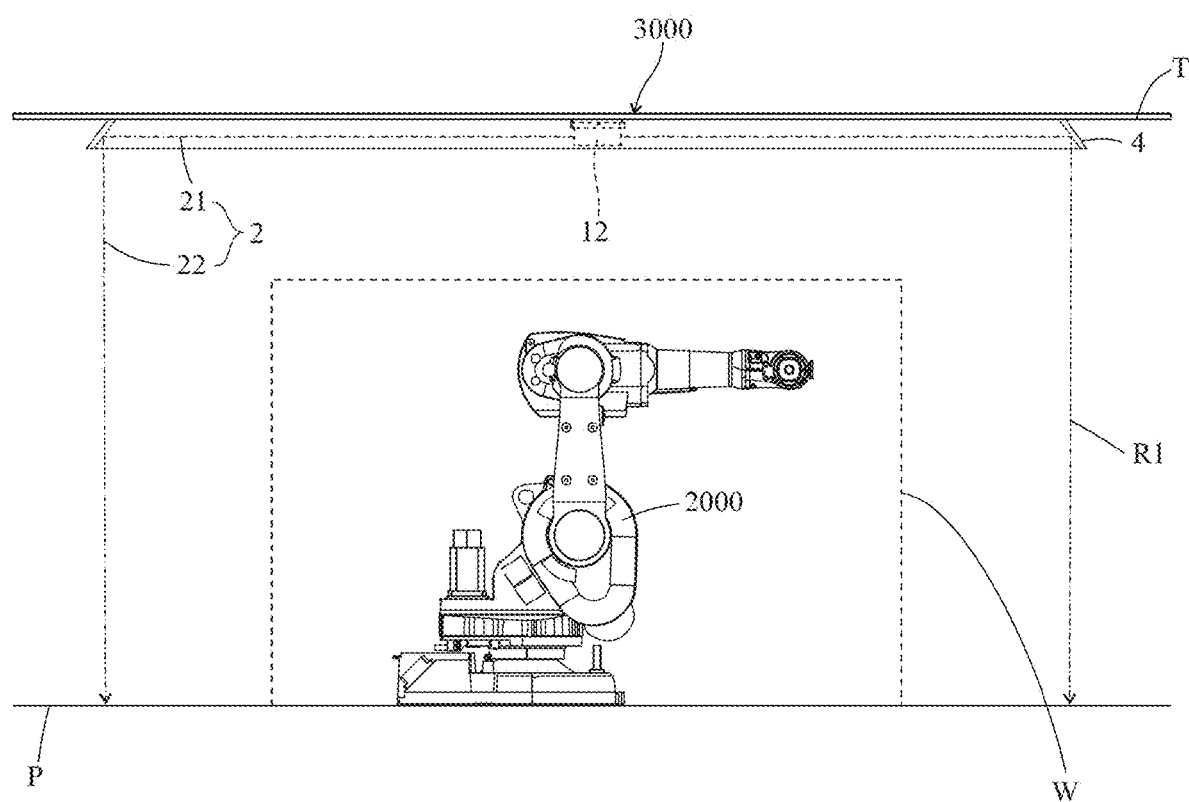
FIG. 13 is a side view showing the detecting system of the second embodiment of the present invention.

The detecting system 3000 of the second embodiment of the present invention is illustrated in FIG. 11, FIG. 12, and FIG. 13. The difference between the first embodiment and the second embodiment is that the detecting system 3000 of the second embodiment omits the first supporting frame 5 and is disposed on a top surface T, for example, the ceiling, above the working surface P. The first diverting element 4 is also in a circular shape and surrounds an area, where the first detector 12 is located. The robotic arm equipment 2000 is disposed on the working surface P and under the first detector 12. The detailed structure of the detecting apparatus 1, and the shape, the tilt, and the operation of the first diverting element 4 are the same as the first embodiment so that the corresponding description is omitted herein.

Figure 14:
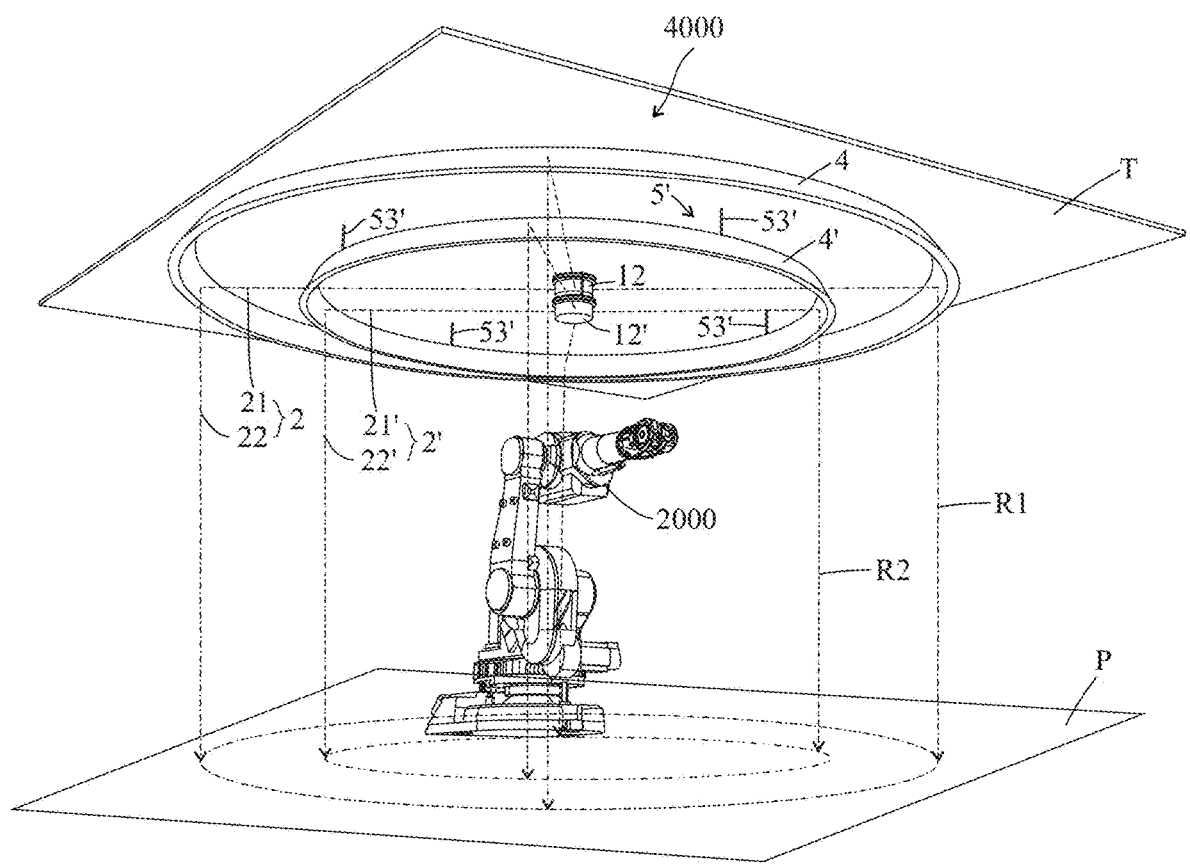
FIG. 14 is a perspective view showing the detecting system of the third embodiment of the present invention.
Figure 15:
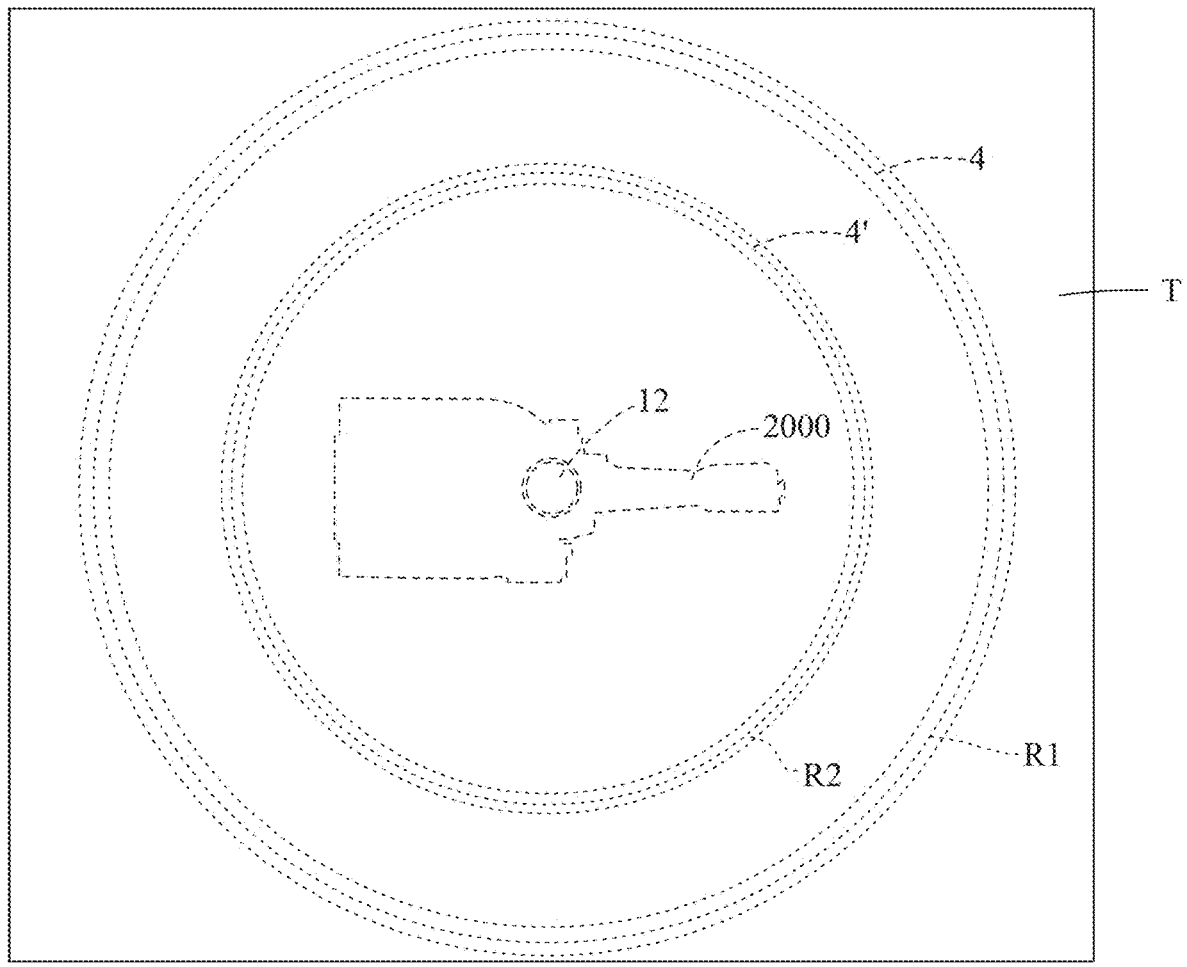
FIG. 15 is a top view showing the detecting system of the third embodiment of the present invention.
Figure 16:
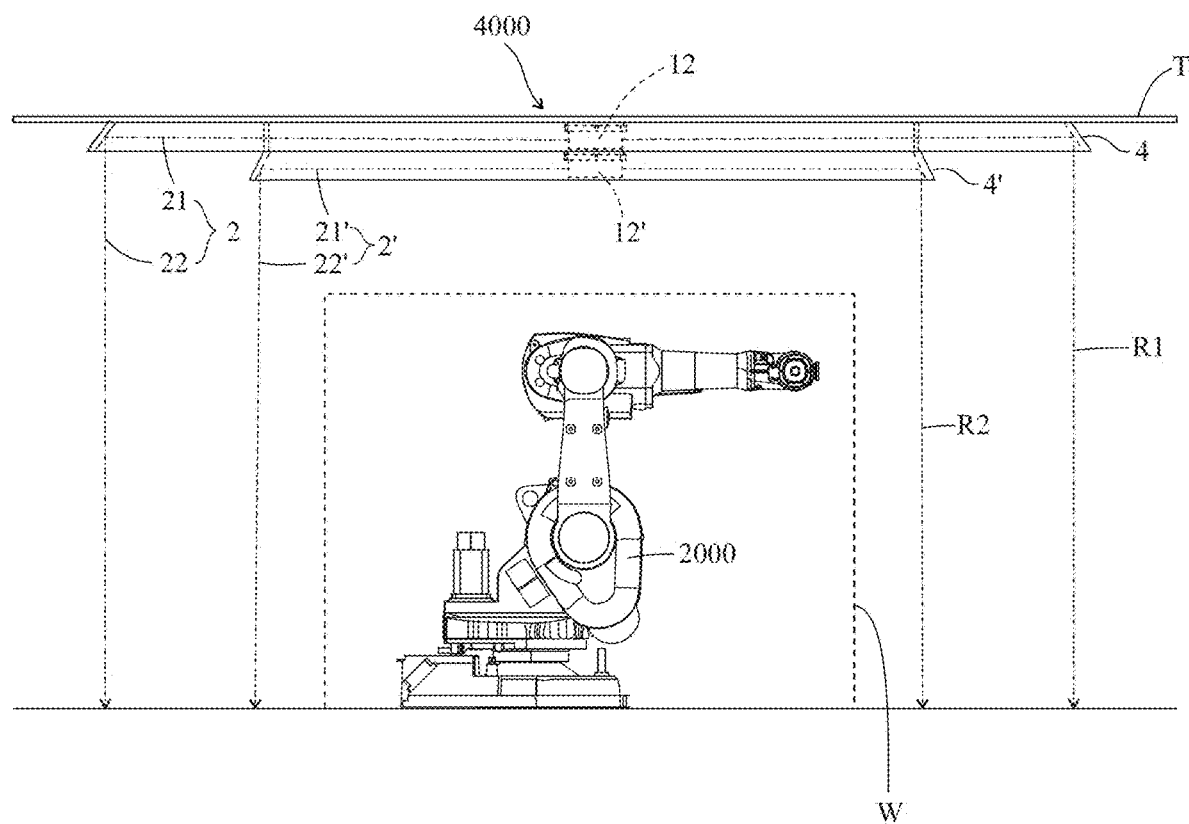
FIG. 16 is a side view showing the detecting system of the third embodiment of the present invention.

Please refer to FIG. 14, FIG. 15, and FIG. 16. The detecting system 4000 of the third embodiment of the present invention is also disposed on a top surface T, for example, the ceiling. However, the detecting system 4000 of the present embodiment further comprises a second detector 12', a three-dimensional safety wave curtain 2', a second diverting element 4', and a second supporting frame 5'. The second detector 12' is stacked on the first detector 12, and the second detector 12' protrudes more than the first detector 12 on the top surface T. The second diverting element 4' is also in a circular shape and has a smaller diameter than the first diverting element 4. The second supporting frame 5' only has four extension poles 53', and each of the extension poles 53' connects between the second diverting element 4' and the top surface T. Therefore, the first diverting element 4 surrounds the second diverting element 4', and the second diverting element 4' is still located outside of the working space W. The second diverting element 4' is lower than the first diverting element 4 and doesn't block between the first diverting element 4 and the transmitter 123 of the first detector 12. According to the abovementioned configuration, a second safety wave curtain 2' is formed between the working space W and the first safety curtain 2.

The advantages of configuring two safety wave curtains include providing different solutions to deal with different intrusion situations. For example, the robotic arm equipment 2000 reduces the speed by 50% when there is an object intruding into the first safety wave curtain 2. The robotic arm equipment 2000 stops operating when there is an object intruding into the second safety wave curtain 2'.

In other embodiments, the robotic arm equipment 2000 is disposed on a working table instead of a working surface P. The robotic arm equipment 2000 can be disposed upside down on the top surface T as long as the configuration of the first diverting element 4 and the first supporting frame 5 is correspondingly adjusted to keep the first safety wave curtain surrounding the working space W.

Figure 17:
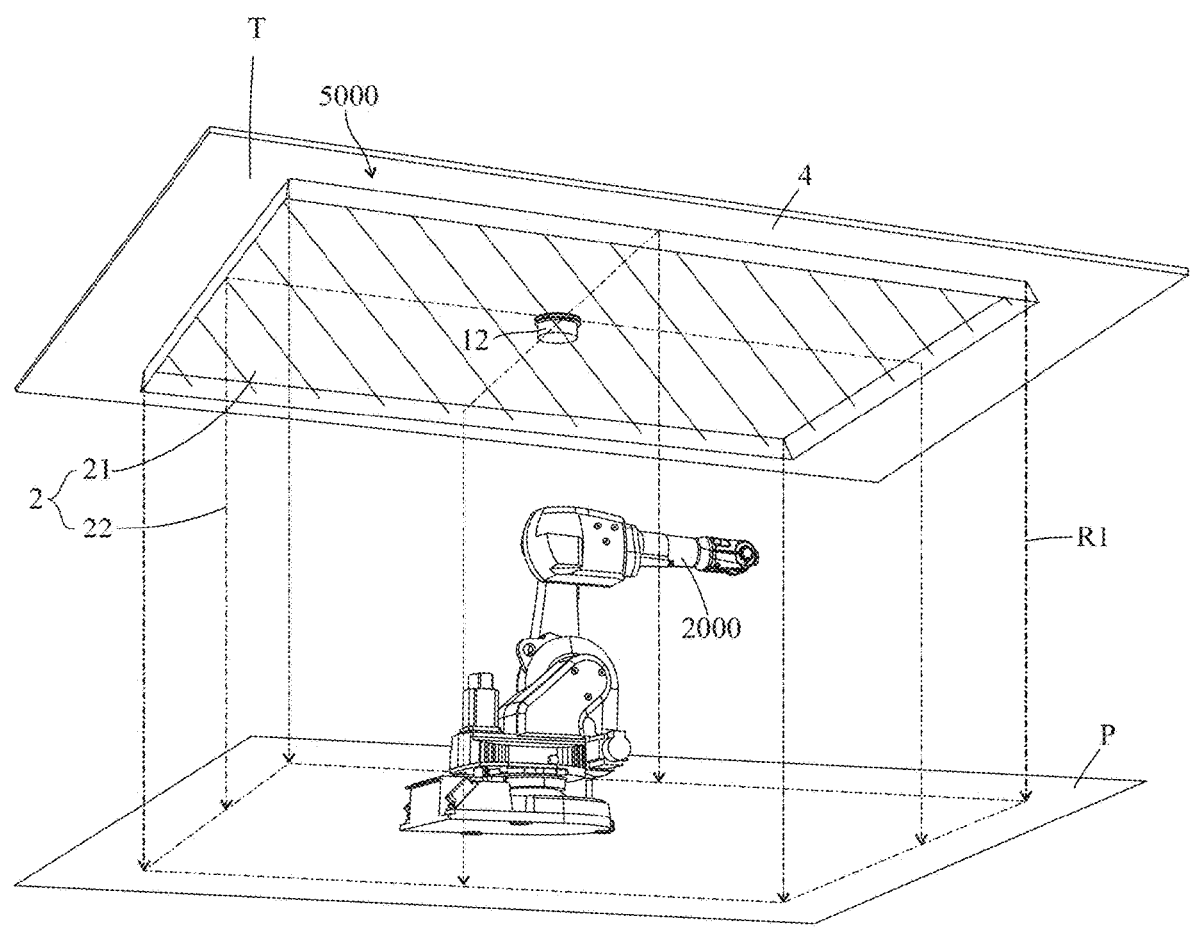
FIG. 17 a perspective view showing the detecting system of the fourth embodiment of the present invention.

The detecting system 5000 of the fourth embodiment of the present invention is shown in FIG. 17. The difference between the fourth embodiment and the second embodiment is that the body 41 of the first diverting element 4 of the fourth embodiment is changed to a rectangular frame. Therefore, the first safety wave curtain 2 is correspondingly changed to a surface with a cuboid shape and has a square cover area 21 and a surrounding area 22 which comprises four rectangular areas.

Figure 18:
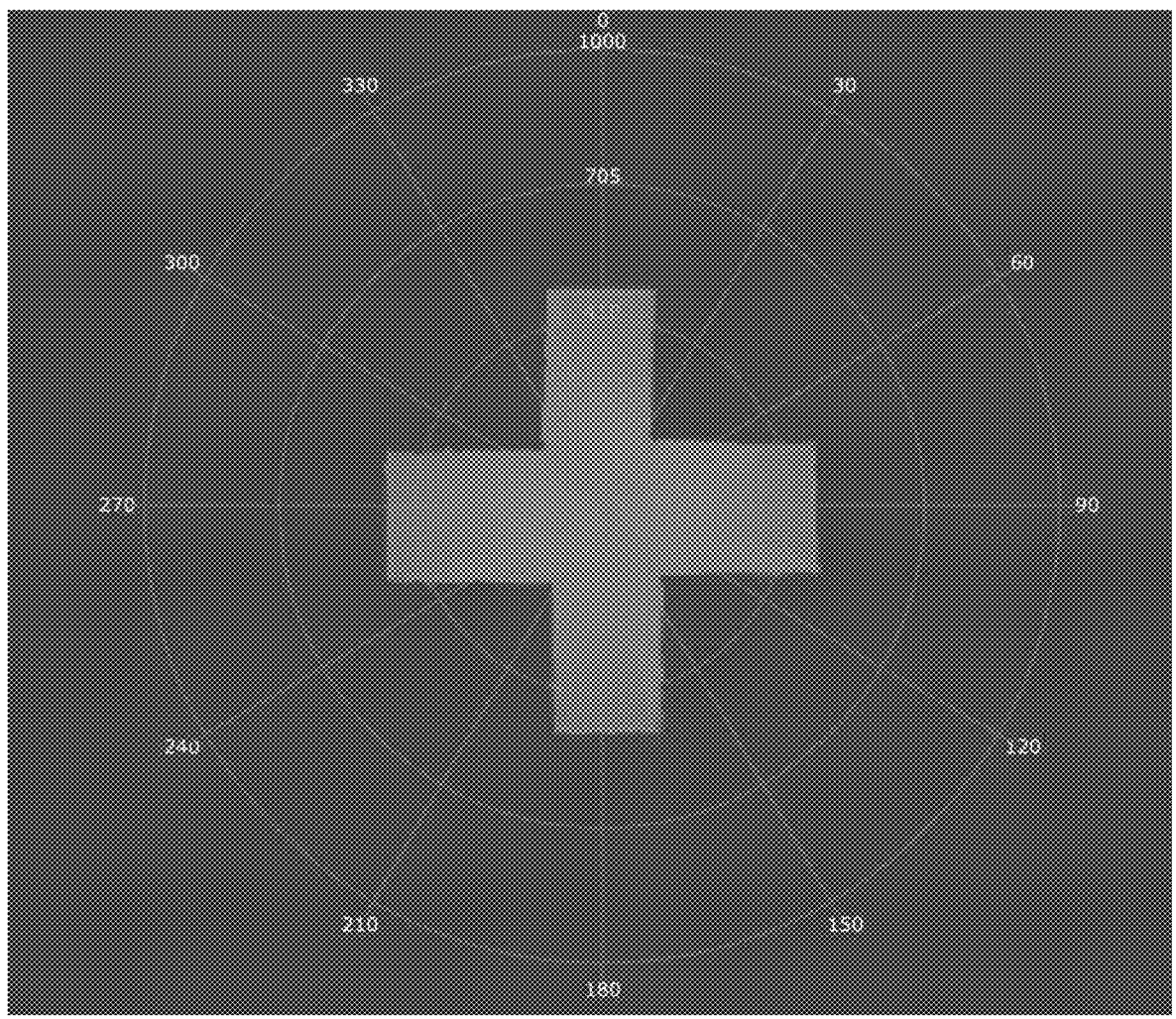
FIG. 18 is a schematic of the display picture of a first alarm range of the detecting system of the fourth embodiment of the present invention.
Figure 19:
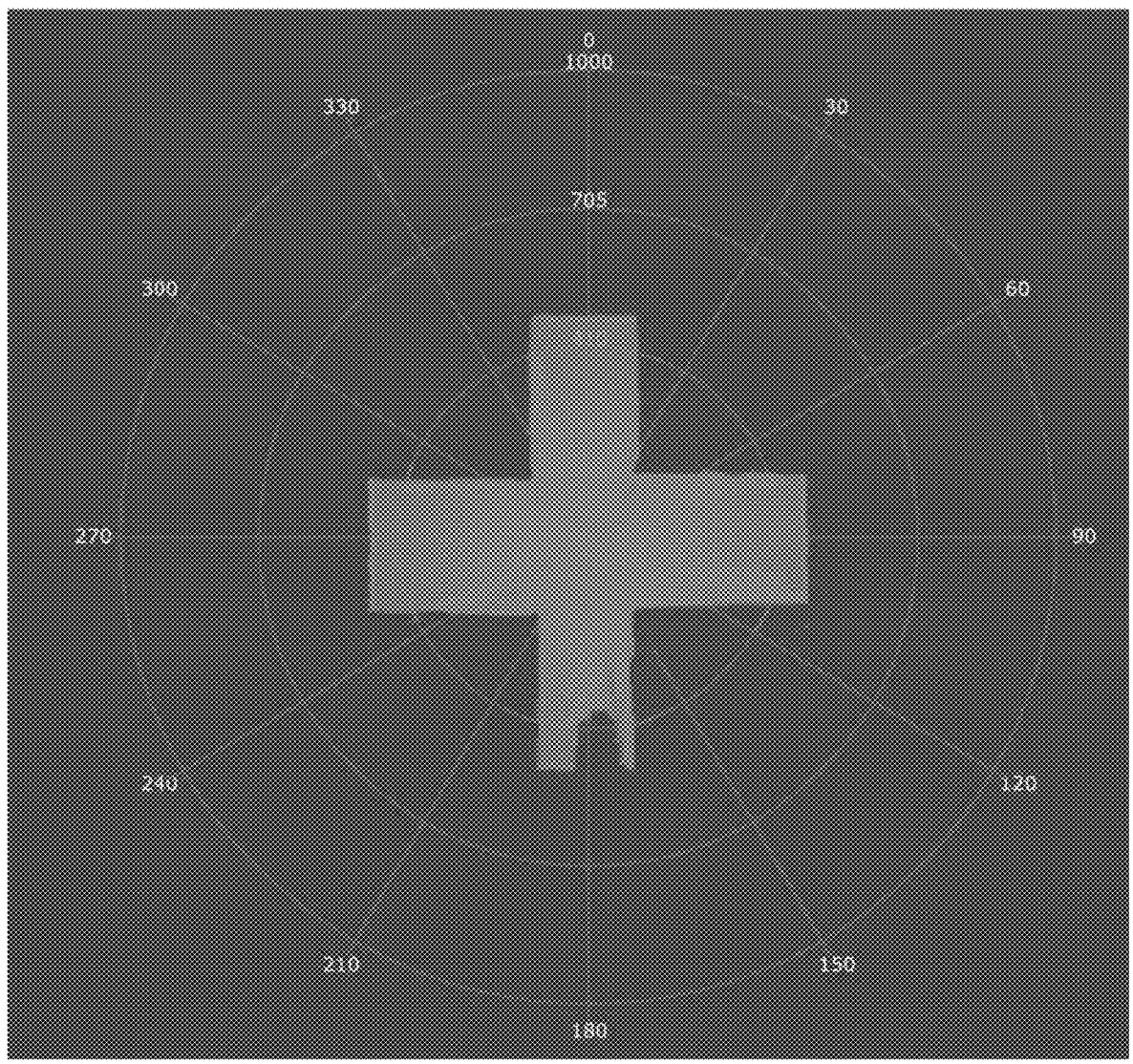
FIG. 19 is a schematic of the display picture of the detecting system of the fourth embodiment of the present invention showing that there is an object intruding.

The present embodiment is used to illustrate another way to determine to alert. The basic time interval, which means no intrusion, of each detection wave in one rotation is converted into an area diagram as shown in FIG. 18. The three-dimensional safety wave curtain 2 is illustrated in two-dimensional, and the area diagram of a cross comprising a square area (corresponding to the cover area 21) and four rectangular areas (corresponding to the surrounding area 22) is thereby formed and used to execute detection and determination. When there is an object (for example, a person) intruding (shown as the shadow at six o'clock position) as illustrated in FIG. 19, the round-trip time of the detection waves around the intruding direction of the object is shorter and defined as the second category of time interval T2i. The covered area is then changed to be smaller.

The threshold value of activating the alarm can be set according to the area change of the above figures, and the standard can be set to an area difference that is greater than a value between 2%-50%. It should be noted that the area conversion process is complex and is therefore executed by the electronic control device 11, which receives the data from the first detector 12, rather than by the first detector 12. The real-time monitoring is displayed on a monitor (not shown) of the electronic control device 11.

Figure 20:
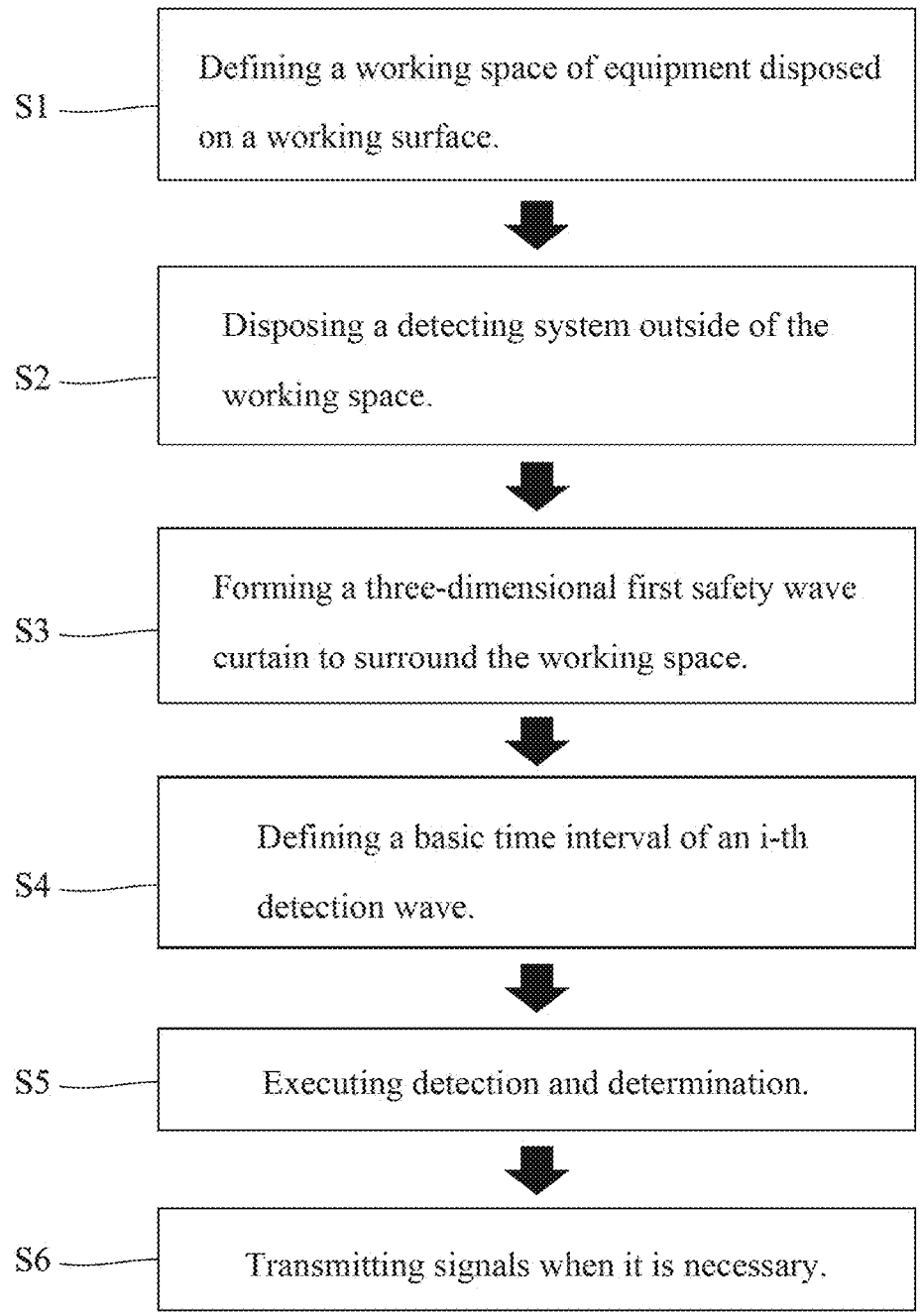
FIG. 20 is an operational flow chart of the detecting system of the present invention.

The operation flow of the detecting system of the present invention is illustrated in FIG. 20. The operation flow comprises Step S1 to Step S6. Wherein, Step S1 to Step S4 are preparation before formal operating. Step S1 and Step S2 are preliminarily configuring the elements of the detecting system 1000. Step S3 and Step S4 are related to the beginning operation of the detecting apparatus 1 and the generation of the basic samples for determining if there is an object. Step S5 is related to the operation status of the detecting system 1000, and Step S6 is triggered when there is an object intruding.

Step S1: defining a working space of an equipment disposed on a working surface. Calculates the maximum range, i.e. the working space W, that the equipment 2000 may reach in operation according to the predetermined operation flow, the movement range in operation, and the reachable area in operation of the equipment 2000.

Step S2: disposing a detecting system outside of the working space. The detecting system comprises a detecting apparatus, a first diverting element, and a first supporting frame. The detecting apparatus 1, the first diverting element 4, and the first supporting frame 5 are disposed outside of the working space W. The detecting system 1000 comprises the aforementioned elements to provide safety protection. The first supporting frame 5 is adapted for the first diverting element 4 and the detecting apparatus 1 to be disposed on. The first supporting frame 5 may be omitted, depending on the configuration of the equipment 2000 and the detecting system 1000.

Step S3: forming a three-dimensional first safety wave curtain to surround the working space. A plurality of detection waves continuously transmitted by the detecting apparatus 1 are diverted by the first diverting element 4 and form the first safety wave curtain 2. The first safety wave curtain 2 surrounds the working space W outside of the working space W and is used to detect if there is any object intruding into the first alarm range R1.

Step S4: defining a basic time interval of the i-th detection wave. In the safety status, which means there is no object intruding into the first alarm range R1, the basic time interval of each of N detection waves transmitted by the detecting apparatus 1 during every rotation is determined. The basic time interval is used as the base of the following comparison. Basically, each of the detection waves travels back and forth along the first path PA1. Therefore, the first detection wave spends the first category of time interval T11 (corresponding to an overall length of the first path L11), the second detection wave spends the first category of time interval T12 (corresponding to the overall length of the first path L12), . . . , the i-th detection wave spends the first category of time interval T1i (corresponding to the overall length of the first path L1i), . . . , the N-th detection wave spends the first category of time interval T1N (corresponding to the overall length of the first path L1N). The first category of time interval T1i of the i-th detection wave is the basic time interval T0i. To avoid the error, the basic time interval T0i (the first category of time interval T1i) of the i-th detection wave is, but not limited to, the average of the time interval of several rounds (3-5 rounds, for example). The basic time interval of each of detection waves is stored in, for example, the controller 125 after it is determined.

Step S5: executing detection and determination. Since each of the detection waves has its basic time interval for comparison, the detection can be then executed. The transmitter 123 and the receiver 124 synchronously rotate, N detection waves are sequentially transmitted along with N times of time detections correspondingly during every rotation. The time interval detected for the i-th detection wave is compared with the basic time interval T0i to determine if the former is the first category of time interval T1i and if the threshold value is reached.

Step S6: transmitting signals when it is necessary. When the threshold value is reached in Step S5, the detecting apparatus 1 informs the alarm 13 to alert and transmits signals to the equipment 2000 at the same time to stop operating or to operate with the safety relay.

In summary, the detecting system of the present invention detects if there is any object intruding into the alarm range when automatic mechanical equipment is in operation. If yes, the automatic mechanical equipment in operation is then controlled to reduce the operating speed or to stop operating. Environmental safety is thereby enhanced when the automatic mechanical equipment is in operation.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A detecting system for protection of an equipment, the equipment being disposed on a working surface and defining a working space corresponding to the working surface, the detecting system comprising:
    a first diverting element approximately surrounding the equipment and being disposed away from the working surface with respect to the equipment, the first diverting element including at least one diverting surface, the diverting surface being not parallel to the working surface;
    a detecting apparatus including an electronic control device and a first detector, the first detector having a transmitter, a receiver, and a controller; and
    a three-dimensional first safety wave curtain correspondingly covering the working space;
    wherein the controller controls the transmitter and the receiver to synchronously rotate about an axis, N detection waves are sequentially transmitted along with N times of time detections correspondingly during every rotation, and the detection waves cooperate with the diverting surface of the first diverting element and the working surface to form the first safety wave curtain, and the first safety wave curtain comprises a cover area approximately perpendicular to the axis and a surrounding area corresponding to the axis, wherein the cover area is formed between the transmitter and the first diverting element, and the surrounding area is formed between the first diverting element and the working surface.

2. The detecting system as claimed in claim 1, wherein a first category of time interval T1i is defined as a time interval between an i-th detection wave transmitted by the transmitter and received by the receiver when there is no object intruding into the first safety wave curtain, and the time interval between the i-th detection wave transmitted by the transmitter and received by the receiver is not equal to the first category of time interval T1i when there is an object intruding into the first safety wave curtain.

3. The detecting system as claimed in claim 1, further comprising a first supporting frame, the first supporting frame including at least one vertical pole, a platform, and at least one extension pole, the at least one vertical pole disposed on the working surface, the platform being disposed on the at least one vertical pole, the at least one extension pole being disposed on the platform and extending outwards to connect the first diverting element, and the transmitter and the receiver of the first detector being disposed on the platform.

4. The detecting system as claimed in claim 3, wherein the number of the at least one extension pole is four, the first diverting element includes four bodies and four diverting surfaces, each of the diverting surfaces is correspondingly formed on each of the bodies, each of the bodies is correspondingly disposed on each of the extension poles, and the bodies surround to form a rectangle.

5. The detecting system as claimed in claim 3, wherein the diverting element includes a body and a diverting surface, the diverting surface is formed on the body, and the body is circular.

6. The detecting system as claimed in claim 1, wherein the i-th detection wave travels along a first path PA1i, the first path PA1i includes an A1i section, a B1i section, a C1i section, and a D1i section, and wherein the i-th detection wave travels from the transmitter to the first diverting element along the A1i section, travels from the first diverting element to the working surface along the B1i section, travels from the working surface to the first diverting element along the C1i section, and then travels from the first diverting element to the receiver along the D1i section.

7. The detecting system as claimed in claim 6, wherein the time interval between the i-th detection wave transmitted by the transmitter and received by the receiver is a second category of time interval, a third category of time interval, or a fourth category of time interval when there is an object intruding into the first safety wave curtain, and wherein the second category of time interval is shorter than the first category of time interval, the third category of time interval is longer than the first category of time interval, and the fourth category of time interval is defined as that the i-th detection wave is received or not received by the receiver after a predetermined time.

8. The detecting system as claimed in claim 1, further comprising:
    a second diverting element approximately surrounding the equipment and being disposed away from the working surface with respect to the equipment, the second diverting element including at least one diverting surface, the diverting surface being not parallel to the working surface; and a three-dimensional second safety wave curtain being formed between the working space and the first safety wave curtain;
wherein the detecting apparatus further comprises a second detector, the second detector has a transmitter, a receiver, and a controller, the controller of the second detector controls the transmitter and the receiver of the second detector to synchronously rotate about the axis, N detection waves are sequentially transmitted along with N times of time detections correspondingly during every rotation, and the detection waves cooperate with the diverting surface of the second diverting element and the working surface to form the second safety wave curtain.

9. The detecting system as claimed in claim 8, wherein a first category of time interval T1i is defined as a time interval between an i-th detection wave transmitted by the transmitter of the second detector and received by the receiver of the second detector when there is no object intruding into the second safety wave curtain, and the time interval between the i-th detection wave transmitted by the transmitter and received by the receiver is not equal to the first category of time interval T1i when there is an object intruding into the second safety wave curtain.

10. The detecting system as claimed in claim 9, wherein the i-th detection wave travels along a first path PA1i, the first path PA1i includes an A1i section, a B1i section, a C1i section, and a D1i section, and wherein the i-th detection wave travels from the transmitter of the second detector to the second diverting element along the A1i section, travels from the second diverting element to the working surface along the B1i section, travels from the working surface to the second diverting element along the C1i section, and then travels from the second diverting element to the receiver of the second detector along the D1i section.

11. The detecting system as claimed in claim 10, wherein the time interval between the i-th detection wave transmitted by the transmitter of the second detector and received by the receiver of the second detector is a second category of time interval, a third category of time interval, or a fourth category of time interval when there is an object intruding into the second safety wave curtain, and wherein the second category of time interval is shorter than the first category of time interval, the third category of time interval is longer than the first category of time interval, and the fourth category of time interval is defined as that the i-th detection wave is received or not received by the receiver of the second detector after a predetermined time.

12. A detecting method, comprising the following steps of:
S1: defining a working space for an equipment disposed on a working surface;
S2: disposing a detecting system outside of the working space wherein the detecting system comprises a detecting apparatus and a first diverting element, the detecting apparatus has a first detector, the first detector has a transmitter, a receiver, and a controller, the controller controls the transmitter and the receiver to synchronously rotate about an axis;
S3: forming a three-dimensional first safety wave curtain to surround the working space wherein the first safety wave curtain comprises a cover area approximately perpendicular to the axis and a surrounding area corresponding to the axis, wherein the cover area is formed between the transmitter and the first diverting element, and the surrounding area is formed between the first diverting element and the working surface;
S4: defining a basic time interval of an i-th detection wave; and
S5: executing detection and determination.

13. The detecting method as claimed in claim 12, wherein the step S4 comprises:
transmitting N detection waves during every rotation and determining the basic time interval of each of the N detection waves in a safety status.

14. The detecting method as claimed in claim 13, wherein the step S5 comprises the following steps:
transmitting N detection waves sequentially and processing N time detections correspondingly during every rotation;
comparing a time interval detected for the i-th detection wave with the basic time interval of the i-th detection wave; and
determining whether a threshold value is reached.

15. The detecting method as claimed in claim 14, further comprising a step:
S6: transmitting signals when it is necessary.

16. The detecting method as claimed in claim 15, wherein the step S6 comprises:
informing an alarm to alert when the threshold value is reached.

17. The detecting method as claimed in claim 12, wherein the detecting system comprises a first supporting frame.

* * * * *